US008166039B1

(12) United States Patent
Haveliwala

(10) Patent No.: US 8,166,039 B1
(45) Date of Patent: Apr. 24, 2012

(54) SYSTEM AND METHOD FOR ENCODING DOCUMENT RANKING VECTORS

(75) Inventor: Taher H. Haveliwala, Mountain View, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1865 days.

(21) Appl. No.: 10/991,663

(22) Filed: Nov. 17, 2004

Related U.S. Application Data

(60) Provisional application No. 60/523,360, filed on Nov. 17, 2003.

(51) Int. Cl.
G06F 17/30 (2006.01)
(52) U.S. Cl. .................... 707/741; 707/748
(58) Field of Classification Search .............. 707/741, 707/748, 6
See application file for complete search history.

(56) References Cited

U.S. PATENT DOCUMENTS

| | | | | |
|---|---|---|---|---|
| 5,619,709 | A * | 4/1997 | Caid et al. ................ | 715/209 |
| 5,794,178 | A * | 8/1998 | Caid et al. ................ | 704/9 |
| 5,864,846 | A * | 1/1999 | Voorhees et al. .......... | 1/1 |
| 6,285,999 | B1 | 9/2001 | Page ........................ | 707/5 |
| 6,567,797 | B1 * | 5/2003 | Schuetze et al. .......... | 707/2 |
| 7,152,065 | B2 | 12/2006 | Behrens et al. ........... | 1/1 |
| 7,188,117 | B2 * | 3/2007 | Farahat et al. ............ | 707/688 |
| 7,251,637 | B1 * | 7/2007 | Caid et al. ................ | 706/15 |
| 7,319,998 | B2 * | 1/2008 | Marum Campos et al. .... | 1/1 |
| 7,941,431 | B2 * | 5/2011 | Bluhm et al. ............. | 707/736 |
| 8,069,105 | B2 * | 11/2011 | Lawrence ................. | 705/37 |
| 2002/0133481 | A1 * | 9/2002 | Smith et al. .............. | 707/3 |
| 2003/0009447 | A1 * | 1/2003 | Murray et al. ............ | 707/3 |
| 2003/0126117 | A1 * | 7/2003 | Megiddo et al. .......... | 707/3 |

OTHER PUBLICATIONS

Brin, S., et al., "The Anatomy of a Large-Scale Hypertextual Web Search Engine," 7th Int'l World Wide Web Conference, Brisbane, Australia, 1998.
Dwork, C., et al., "Rank Aggregation Methods for the Web," Proceedings of the 10th Int'l World Wide Web Conference, 2001.
Fagin, R., et al., "Comparing Top κ Lists," Proceedings of the ACM-SIAM Symposium on Discrete Algorithms, 2003.
Gray, R., et al., "Quantization," IEEE Transactions on Information Theory, vol. 44, No. 6, Oct. 1998.
Haveliwala, T., "Efficient Computation of PageRank," Technical report, Stanford University, 1999.
Haveliwala, T., "Topic-Sensitive PageRank," Proceedings of the 11th Int'l World Wide Web Conference, 2002.
Hirai, J., et al., "Webbase: A Repository of Web Pages," Proceedings of the 9th Int'l World Wide Web Conference, 2000.
Jeh, G., et al., "Scaling Personalized Web Search," Technical report, Stanford University, 2002.

(Continued)

Primary Examiner — Kim Nguyen
(74) Attorney, Agent, or Firm — DeMont & Breyer, LLC

(57) ABSTRACT

A method of processing information related to documents in a collection of linked documents. For each respective document in all or a portion of said collection, one or more auxiliary page ranking vectors associated with the respective document are quantized. A search query comprising one or more search terms is received. Using a document index that represents said collection of linked documents, a plurality of documents is identified. Each document in the identified plurality of documents includes at least one term that matches a search term in the search query. For one or more respective documents in the plurality of documents, one or more of the auxiliary page ranking vectors associated with the respective document are decoded. The plurality of documents are then ranked using the decoded auxiliary page vectors.

9 Claims, 12 Drawing Sheets

OTHER PUBLICATIONS

Moffat, A., et al., "In-Place Calculation of Minimum-Redundancy Codes," Workshop on Algorithms and Data Structures, Queen's University, Kingston, Ontario, Aug. 1995, pp. 393-402.

Moffat, A., et al., "Memory Efficient Ranking," Information Processing and Management, vol. 30, No. 6, Nov. 1994, pp. 733-744.

Page, L., et al., "The PageRank Citation Ranking: Bringing Order to the Web," Stanford Digital Libraries Working Paper, 1998.

Pandurangan, G., et al., "Using PageRank to Characterize Web Structure," Proceedings of the 8th Annual Int'l Computing and Combinatorics Conference, 2002.

Panter, P., et al., "Quantization in Pulse-Count Modulation with Nonuniform Spacing of Levels," Proceedings of IRE, Jan. 1951.

Pennock, D., et al., "Winner's Don't Take All: Characterizing the Competition for Links on the Web," Proceedings of the National Academy of Sciences, 2002.

Raghavan, S., et al., "Representing Web Graphics," Proceedings of the 19th IEEE Int'l Conference on Data Engineering (ICDE), 2003.

Richardson, M., et al., "The Intelligent Surfer: Probabilistic Combination of Link and Content Information in PageRank," vol. 14, MIT Press, Cambridge, MA, 2002.

Suel, T., et al., "Compressing the Graph Structure of the Web," IEEE Data Compression Conference (DCC), Mar. 2001.

* cited by examiner $$E[X_i] = mp_i$$

$$var[X_i] \equiv E[X_i^2] - E[X_i]^2$$

$$var[X_i] = mp_i(1-p_i)\frac{N-m}{N-1}$$

$$E[X_i^2] = mp_i(1-p_i)\frac{N-m}{N-1} + (mp_i)^2$$

Plugging $E[X_i^2]$ back into Equation 6 and simplifying, we get $$E[Distortion_m] = \frac{1}{m^2}\sum E[X_i^2]$$

$$= \frac{1}{m^2}\sum_i \left(mp_i(1-p_i)\frac{N-m}{N-1} + (mp_i)^2\right)$$

$$= \frac{1}{m^2}\sum_i \left(\frac{N-m}{N-1}(mp_i - mp_i^2) + m^2p_i^2\right)$$

$$= \frac{N-m}{m(N-1)}\sum_i p_i + \left(1 - \frac{N-m}{m(N-1)}\right)\sum_i p_i^2$$

$$= \frac{N-m}{m(N-1)} + \left(1 - \frac{N-m}{m(N-1)}\right)\sum_i p_i^2$$

Figure 17

SYSTEM AND METHOD FOR ENCODING DOCUMENT RANKING VECTORS

RELATED APPLICATION

This application claims priority to U.S. Provisional Patent Application Ser. No. 60/523,360, filed Nov. 17, 2003, which is incorporated by reference herein in its entirety.

STATEMENT REGARDING FEDERALLY SPONSORED RESEARCH OR DEVELOPMENT

This invention was made with Government support under contract 0085896 awarded by the National Science Foundation. The Government has certain rights in this invention.

TECHNICAL FIELD

The invention relates generally to methods for improving keyterm-search query processing over large document repositories. More particularly, the invention relates to methods of compressing the precomputed document attributes of documents in such repositories.

BACKGROUND

Modern Web search engines incorporate a variety of numerical Web-page attributes in their search ranking functions in an attempt to bring order to the ever-growing Web. Given the massive repositories that Web search engine's must index, with large numbers of concurrent users issuing queries to the system, developing memory-efficient encodings for these numerical attributes, so that they can be cached in main memory, is an increasingly important challenge.

An overview of a scalable keyterm-search system helps make clear why per-document attributes, such as page popularity, are maintained in main memory. As depicted in FIG. 1, a typical Web search system utilizes an inverted text index I and a set of auxiliary ranking vectors $\{\vec{R}_i\}$. For concreteness, consider a system with only one such vector, $\{\vec{R}_p\}$, containing per-document popularity estimates. In FIG. 1, $\{\vec{R}_p\}$ is a single column ($r_1$, $r_2$ or $r_3$) in index 102. The index I contains information about the occurrences of terms in documents and is used to retrieve the set of document IDs for documents satisfying some query Q. The index $\{\vec{R}_p\}$ is then consulted to retrieve the overall popularity score for each of these candidate documents. Using the information retrieved from I and $\{\vec{R}_p\}$, a composite document score is generated for each candidate result, yielding a final ranked listing.

The inverted index/is constructed offline and provides the mapping $\{t \rightarrow f_{dt}\}$ where $f_{dt}$ describes the occurrence of term t in document d. In the simplest case, $f_{dt}$ could be the within-document frequency of t. The number of random accesses to I needed to retrieve the necessary information for answering a query Q exactly equals the number of terms in the query, $|Q|$. Because queries are typically small, consisting of only a few terms, it is practical to keep the index I on-disk and perform $|Q|$ seeks for answering each query.

The auxiliary index $\vec{R}_p$ is also constructed offline, and provides the mapping $\{d \rightarrow r_d\}$, where $r_d$ is the popularity of document d according to some computed notion of popularity. Note that in contrast to I, the index $\vec{R}_p$ provides per-document information. In some but not all cases, the search system accesses $\vec{R}_p$ once for each candidate document of the result set, which could potentially be very large. These random accesses would be prohibitively expensive, unless $\vec{R}_p$ can be kept entirely in main memory. Whereas the query length is the upper bound for the accesses to I, the number of candidate results retrieved from I is the upper bound for accesses to $\vec{R}_p$. One way to reduce the number of random accesses required is to store the attribute values of in I instead; e.g., create an index I' that provides the mapping $\{t \rightarrow \{f_{di}, r_d\}\}$. However, this requires replicating the value rd once for each distinct term that appears in rd, generally an unacceptable overhead especially if more than one numeric property is used.

Much work has been done on compressing I, although comparatively less attention has been paid to effective ways of compressing auxiliary numeric ranking vectors such as $\vec{R}_p$. The typical keyterm search system has only one such auxiliary ranking vector $\vec{R}_l$, the document lengths needed in computing the query-document cosine similarity. For more information on the query-document cosine similarity metric, see Witten et al., Managing Gigabytes, Morgan Kaufmann, San Francisco, 1999, which is hereby incorporated by reference in its entirety. This metric can be kept in main memory without much difficulty. However, for more comprehensive ranking schemes, such as PageRank and topic-sensitive PageRank, which require consulting a set of auxiliary ranking vectors, more consideration needs to be given to the encodings used for the attribute values. For more information on such ranking schemes see, for example, Lawrence et al., "The PageRank citation ranking: Bringing order to the web," Stanford Digital Libraries Working Paper, 1998; Haveliwala, "Topic-sensitive PageRank," Proceedings of the Eleventh International World Wide Web Conference, 2002; Richardson and Domingos, "The Intelligent Surfer: Probabilistic Combination of Link and Content Information in PageRank," volume 14. MIT Press, Cambridge, Mass., 2002; and Jeh and Widom, "Scaling personalized web search," *Stanford University Technical Report*, 2002; Brin and Page, "The Anatomy of a Large-Scale Hypertextual Search Engine," $7^{th}$ International World Wide Web Conference, Brisbane, Australia; and U.S. Pat. No. 6,285,999, each of which is hereby incorporated by reference in its entirety.

Falling main memory prices have not alleviated the need for efficient encodings. This is because increasingly affordable disk storage is leading to rapidly growing Web-crawl repositories, which in turn is leading to larger sets of documents that need to be indexed. Utilizing a rich set of per-document numeric ranking attributes for growing crawl repositories and growing numbers of users thus continues to require efficient encoding schemes.

In summary, the rapid growth of the Web has led to the development of many techniques for enhancing search rankings by using precomputed numeric document attributes such as the estimated popularity or importance of Web pages. For efficient keyterm-search query processing over large document repositories, it is important that these auxiliary attribute vectors, containing numeric per-document properties, be kept in main memory. When only a small number of attribute vectors are used by the system (e.g., a document-length vector for implementing the cosine ranking scheme), a 4-byte, single-precision floating point representation for the numeric values suffices. However, for richer search rankings, which incorporate additional numeric attributes (e.g., a set of page-importance estimates for each page), it becomes more difficult to maintain all of the auxiliary ranking vectors in main memory.

Accordingly, given the above background, effective systems and methods for compressing precomputed auxiliary ranking vectors would be highly desirable.

SUMMARY

The present invention addresses the shortcomings of the known art. In the present invention, lossy encoding schemes based on scalar quantization are used to encode auxiliary numeric properties, such as PageRank, an estimate of page importance used by the Google search engine. Unlike standard scalar quantization algorithms, which concentrate on minimizing the numerical distortion caused by lossy encodings, the distortion of search-result rankings is minimized.

One embodiment of the present invention provides a method of processing information related to documents in a collection of linked documents. In the method, for each respective document in all or a portion of said collection, an auxiliary page ranking vector associated with the respective document is quantized. A search query comprising one or more search terms is received. Then, using a document index that represents the collection of linked documents, a plurality of documents is identified. Each document in the identified plurality of documents includes at least one term that matches a search term in the search query. For one or more respective documents in the plurality of documents, the auxiliary page ranking vector associated with the respective document is decoded. Finally, the plurality of documents is ranked using the decoded auxiliary page vectors. In some embodiments, each auxiliary page ranking vector comprises a plurality of attributes and each attribute is quantized in an independent manner.

In some embodiments the ranking comprises ranking, for each respective attribute in the plurality of attributes, the plurality of documents in order to form an intermediate rank order. Then, each of these intermediate rank orders is aggregated to generate a final rank order for the plurality of documents. In some embodiments, the quantizing uses a first quantizer to quantize values for a first attribute in the auxiliary page ranking vectors associated with the collection and the decoding decodes the first values for the first attribute.

In some embodiments, a first quantizer partitions a plurality of values for a first attribute, represented in the auxiliary page ranking vectors associated with the collection, into a first plurality of cells such that each cell in the plurality of cells is assigned the same number of documents (or approximately the same number of documents). In some embodiments, the values x for the first attribute in the auxiliary page ranking vectors associated with the collection are distributed in a power-law distribution m, and, prior to quantization by the first quantizer, the method comprises transforming the values x for the first attribute in the auxiliary page ranking vectors associated with the collection with a first function $F_1(x)$ such that the transformed values become uniformly distributed such that the first quantizer partitions the plurality of transformed first values into a plurality of uniformly spaced cells. In some embodiments, first function is:

$$F_1(x) = \frac{k}{y-1}(x_{min}^{-(m-1)} - x^{-(m-1)})$$

where $x_{min}$ is the minimum possible rank for x and k is a normalization constant.

In some embodiments, the quantizing uses a second quantizer to quantize values for a second attribute in the auxiliary page ranking vectors associated with the collection and the decoding decodes the second values for the second attribute. In some embodiments, the values y for the second attribute in the auxiliary page ranking vectors associated with the collection are distributed in a power-law distribution n such that, prior to quantization by the second quantizer, the method comprises transforming the values y for the second attribute in the auxiliary page ranking vectors associated with the collection with a second function F2(y) such that the transformed values become uniformly distributed. In some embodiments $$F_2(y) = \frac{k}{y-1}(x_{min}^{-(n-1)} - x^{-(n-1)})$$

where xmin is the minimum possible rank for x and k is a normalization constant.

Another embodiment of the present invention provides a computer system for processing information related to documents in a collection of linked documents. The computer system comprising a central processing unit and a memory, coupled to the central processing unit. The memory comprises: (i) a document indexer; (ii) a document index comprising indexes for a plurality of documents; and (iii) an auxiliary page rank data structure such that the auxiliary page rank data structure comprises a plurality of quantized auxiliary page ranking vectors. In some embodiments, the computer system further comprises one or more quantizers to quantize the auxiliary page rank data structure.

BRIEF DESCRIPTION OF THE DRAWINGS

FIG. 17 is a derivation of the expectation of Equation 5 based upon the assumption that each $X_i$ (the number of documents in a query that fall into cell i) follows a multivariate hypergeometric distribution rather than a binomial distribution.

Like reference numerals refer to corresponding parts throughout the several views of the drawings.

DETAILED DESCRIPTION OF EMBODIMENTS

Figure 16:
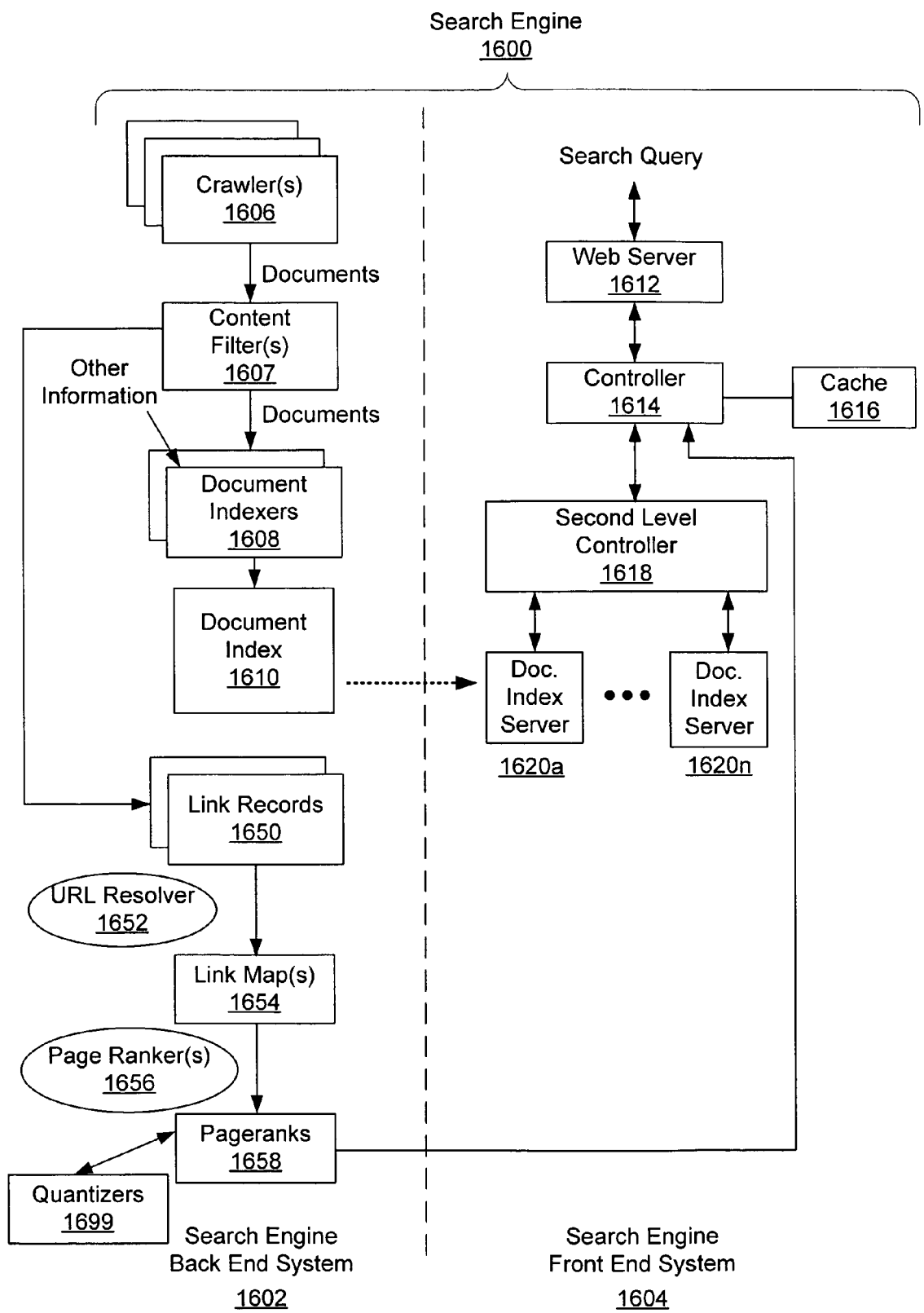
FIG. 16 is a block diagram of a search engine having a back end system and a front end system, in accordance with some embodiments of the present invention.

1. THE SEARCH ENGINE ENVIRONMENT. The techniques of the present invention are used in a search engine environment. FIG. 16 is a block diagram of one such typical search engine environment. As illustrated in FIG. 16, search engine 1600 has a back end system 1602 and a front end system 1604. The layout of the search engine system 1600 is merely exemplary and can take on any other suitable layout or configuration.

Figure 1:
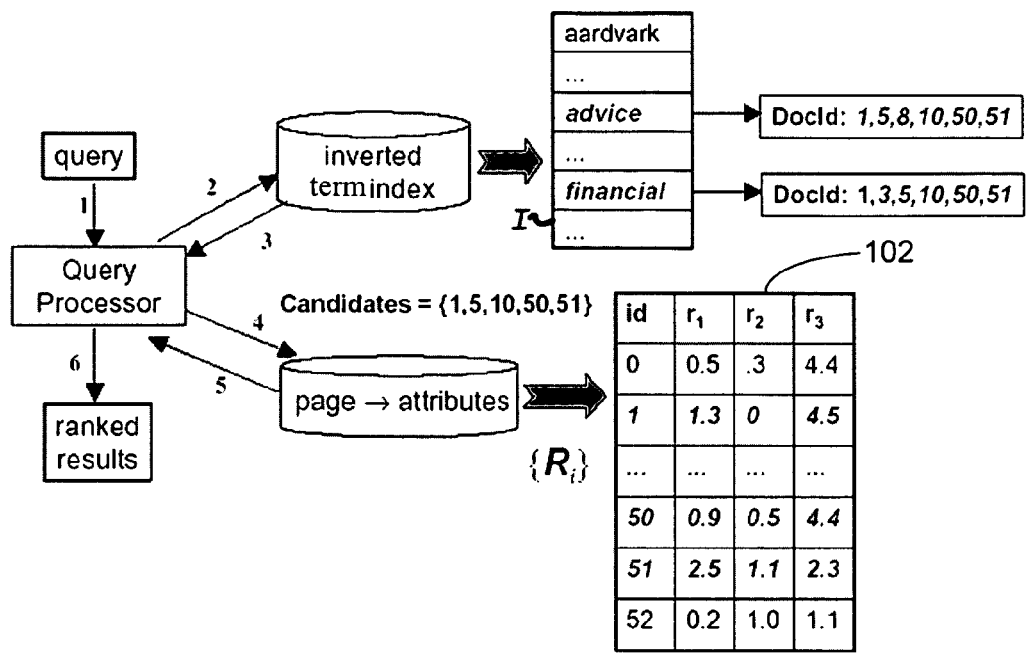
FIG. 1 illustrates a search engine with a standard inverted text-index and three auxiliary numerical attributes (r1, r2, and r3) for each document in accordance with the known art. The number of random accesses to I is typically small whereas the number of accesses to {Ri} is large.

Back end system 1602 generally includes one or more crawlers 1606 (also known as spiders), one or more document indexers 1608 and a document index 1610. To index the large number of Web pages that exist on the worldwide web, web crawler 1606 locates and downloads web pages and other information (hereinafter also referred to as "documents"). In some embodiments, a set of content filters 1607 identify and filter out duplicate documents, and determine which documents should be sent to the document indexers 1608 for indexing. Document indexers 1608 process the downloaded documents, creating document index 1610 of terms found in those documents. If a document changes, then document index 1610 is updated with new information. Until a document is indexed, it is generally not available to users of search engine 1600. Document index 1610 of FIG. 16 is equivalent to the term index of FIG. 1.

Front end system 1604 generally includes a web server 1612, a controller 1614, a cache 1616, a second level controller 1618 and one or more document index servers 1620a, . . . , 1620n. Document index 1610 is created by search engine 1600 and is used to identify documents that contain one or more terms in a search query. To search for documents on a particular subject, a user enters or otherwise specifies a search query, which includes one or more terms and operators (e.g., Boolean operators, positional operators, parentheses, etc.), and submits the search query to search engine 1600 using web server 1612.

Controller 1614 is coupled to web server 1612 and cache 1616. Cache 1616 is used to speed up searches by temporarily storing previously located search results. In some embodiments, cache 1616 includes both high speed memory and disk storage for storing cache search results. In some embodiments, cache 1616 is distributed over multiple cache servers. Furthermore, in some embodiments, the data (search results) in cache 1616 is replicated in a parallel set of cache servers. Providing more than one copy of the cache data provides both fault tolerance and improved throughput for quickly retrieving search results generated during a previous search in response to the search query.

Controller 1614 is also coupled to second level controller 1618 which communicates with one or more document index servers 1620a, . . . , 1620n. Document index servers 1620a, . . . , 1620n encode the query into an expression that is used to search document index 1610 to identify documents that contain the terms specified by the search query. In some embodiments, document index servers 1620 search respective partitions of document index 1610 generated by back end system 1602 and return their results to second level controller 1618. Second level controller 1618 combines the search results received from document index servers 1620a, . . . , 1620n, removes duplicate results (if any), and forwards those results to controller 1614. In some embodiments, there are multiple second level controllers 1618 that operate in parallel to search different partitions of document index 1610, each second level controller 1618 having a respective set of document index servers 1620 to search respective sub-partitions of document index 1610. In such embodiments, controller 1614 distributes the search query to the multiple second level controllers 1618 and combines search results received from the second level controllers 1618. Controller 1614 also stores the query and search results in cache 1616, and passes the search results to web server 1612. A list of documents that satisfy the query is presented to the user via web server 1612.

In some embodiments, the content filters 1607, or an associated set of servers or processes, identify all the links in every web page produced by the crawlers 1606 and store information about those links in a set of link records 1650. Link records 1650 indicate both the source URL and the target URL of each link, and may optionally contain other information as well, such as the "anchor text" associated with the link. A URL Resolver 1652 reads the link records 1650 and generates a database 1654 of links, also called link maps, which include pairs of URLs or other web page document identifiers. In some embodiments, links database 1654 is used by a set of one or more Page Rankers 1656 to compute PageRanks 1658 for all the documents downloaded by the crawlers. These PageRanks 1658 are then used by controller 1614 to rank the documents returned from a query of document index 1610 by document index servers 1620. In certain embodiments of the present invention, back end system 1602 further comprises quantizers 1699 that are used to quantize data in PageRanks 1658.

The embodiment illustrated in FIG. 16 is merely exemplary. A number of methods for computing auxiliary page ranking data (auxiliary page ranking vectors) are known in the art and any combination of the page ranking metrics generated by such methods can be compressed using the systems and methods of the present invention. In addition, Brin and Page, "The Anatomy of a Large-Scale Hypertextual Search Engine," 7$^{th}$ International World Wide Web Conference, Brisbane, Australia, which is hereby incorporated by reference in its entirety, provides more details on how a PageRank metric can be computed.

Overview. Exemplary search engine environments that include auxiliary page rankings, such as PageRank, have been described in conjunction with FIGS. 1 and 16. The present invention provides advantageous methods for compressing such information. In particular, the present invention will describe ways to encode PageRank vectors. However, those of skill in the art will appreciate that the methods of the present invention can be used to compress any form of auxiliary vector. Before describing the compression algorithms of the present invention, scalar quantization, which provides the framework for our approach, will be reviewed. Further, a novel distortion criteria for measuring quantizer performance will be discussed. Then, various fixedlength encoding schemes in accordance with the present invention will be considered and their performance analyzed using a traditional numerical distortion measure. Next, distortion measures more appropriate for the case of search ranking functions will be described and the performance of the various quantization strategies of the present invention will be analyzed both analytically and empirically. Finally, an extension of the novel methods that considers variable-length encoding schemes will be described. See also, Haveliwala, "Efficient Encodings for Document Ranking Vectors," The 4th International Conference on Internet Computing, IC'2003: Jun. 23-26, 2002, Las Vegas, Nev., USA; also published as Haveliwala, "Efficient Encodings for Document Ranking Vectors," Stanford University technical report, Nov. 18, 2003, which is hereby incorporated by reference in its entirety 2. SCALAR QUANTIZATION. Quantization Rules. An introduction to quantization is found in Gray and Neuhoff, "Quantization," IEEE Transactions on Information Theory 44(6), October 1998, which is hereby incorporated by reference in its entirety. The dictionary meaning of quantization is the division of a quantity into a discrete number of small parts, often assumed to be integral multiples of a common quantity. An example of quantization is rounding off. Any real number x can be rounded off to the nearest integer, say q(x), with a resulting quantization error e=q(x)−x so that q(x)=x+e.

More generally, assume C is finite and let C ⊂ $\Re$, where $\Re$ is all real numbers. A quantizer is a function q(x): $\Re \to$ C that partitions $\Re$ into a set S of intervals and maps values in the same interval to some common reproduction value in C. In other words, q(x) maps real values to some approximation of the value. Let n=|C|. As the values in C can be indexed from 0 to n−1, one way to compactly represent values in the range of q(x) is with fixed-length codes of length [log$_2$n] bits, in conjunction with a codebook mapping the fixed-length codes to the corresponding reproduction value. Let $\hat{x}$=q(x). Given the sequence $\{a_i\}$ of real numbers as input, a compression algorithm based on fixed-length scalar quantization would output the sequence of l-bit codewords $\hat{a}_i$, along with the codebook mapping each distinct codeword to its corresponding reproduction value. The error that results from quantizing a particular input value x to the reproduction value $\hat{x}$ is typically quantified by a distortion measure.

The simplest fixed-length encoding simply partitions the domain of possible values into n cells of uniform width using a uniform quantizer $u_n$, where n is typically chosen to be a power of 2. A more complex quantizer could use a nonuniform partition to lower the distortion. Alternatively, instead of using nonuniform partitions, the input values can be transformed with a nonlinear function G(x), called a compressor, then uniformly quantized using $u_n$. The inverse function $G^{-1}(x)$ can be used for reconstructing an approximation to the original value. Such a quantizer $G^{-1}(u_n(G(x)))$ is called a compander. The term compander is short for compressor, expander. Companders save on the need for explicit codebooks, as the partitioning of the domain is uniform. $G^{-1}(x)$ takes the place of a codebook. It is known that any fixed-length, nonuniform quantizer can be implemented by an equivalent compander. See, for example, Gray and Neuhoff, "Quantization," IEEE Transactions on Information Theory 44(6), October 1998, which is hereby incorporated by reference in its entirety. For simplicity, unless otherwise noted, quantization strategies are denoted herein as companders.

Quantizers can also make use of variable-length codes for the elements in set C. If shorter codewords are assigned to the elements in C that more frequently correspond to values in the input data being compressed, the average codeword length can be reduced. The simplest scheme would use a Huffman code for C, using the known or estimated frequency of the elements in C to generate the optimal Huffman codes. Variable-length codes other than Huffman codes can also be used. See, for example, Adámek, *Foundations of Coding*, John Wiley & Sons, Inc., Hoboken, N.J., which is hereby incorporated by reference in its entirety.

Measuring distortion. Scalar quantization literature in general considers the loss in numerical precision when comparing the expected distortion of quantization schemes. For instance, the most commonly used measure of distortion for a value is the squared error:

$$d(x,q(x))=(x-q(x))^2 \qquad (1)$$

The inaccuracy of a particular quantization function q for a particular set of input data is then the mean distortion, denoted D(q). If d(x,q(x)) is the squared error as defined above, then D(q) is referred to as the mean squared error, or MSE.

However, in the case of document ranking, the numerical error of the quantized attribute values themselves are not as important as the effect of quantization on the rank order induced by these attributes over the results to a search query. In the present invention, it is demonstrated that distortion measures based on induced rankings of search-query results lead to different choices for optimal encoding of auxiliary numerical ranking attributes, such as PageRank.

Assume each document in a corpus has k associated numerical ranking attributes. Note that some of these attributes, such as PageRank, are precomputed and stored, and some are query-specific and hence generated at query-time. As the goal of quantization is to reduce space requirements of the precomputed indexes, it is used only on the precomputed attributes. The attributes can be used in one of two ways to rank a set of documents that are candidate results to some search query. For example, the candidate set might consist of documents that contain all of the query terms. There are two scenarios are to be considered. In the first scenario (scenario 1), each of the k attributes can be used separately to rank the candidate result documents to generate k intermediate rank orders, which are then aggregated to generate a final rank order over the candidates. This scenario is described in Dwork et al., "Rank aggregation methods for the web," Proceedings of the Tenth International World Wide Web Conference, 2001. In the second scenario (scenario 2), the values for the k attributes for the documents can be combined numerically to form a composite score, which is then used to rank the set of candidate documents.

TDist, a distortion measure for scenario 1. Under the first scenario, quantization has a simple effect on the intermediate rank orders. Quantization can map similar values to the same cell, but does not swap the relative order of two values; for any two values x and y, and for any quantizer q, it known that $x<y \Rightarrow q(x) \leq q(y)$. Thus, an intermediate rank order using a quantized version of an attribute differs from the intermediate rank order using the original attribute only through the introduction of false ties. The final rankings, after rank aggregation, may of course differ in more complex ways, depending on how the aggregation is done. This property suggests the following distortion measure for scenario 1. Let the distortion of a quantizer on a particular attribute, for a particular candidate result set of size m, be measured as the sum of squares of the number of candidate documents mapped to the same cell, normalized so that the maximum distortion is 1. Assuming the original values for the attribute were distinct, this distortion is closely related to the fraction of document pairs in the result set that are falsely tied. More formally, let R be the query-result set, with m=|R| (i.e., the absolute number of documents in R) and let $X_i$ be the number of documents in R mapped to cell i for the attribute under consideration. The distortion of an n-cell quantizer $q_j$ on the set R is given by:

$$\text{Distortion}(q_j, R) = \frac{1}{m^2} \sum_{0}^{n-1} X_i^2 \quad (2)$$

This distortion measure is referred to as TDist. To see how TDist works, consider the case in which a query returned four documents and the quantizer quantizes the four documents into a space that has ten cells. Now consider the case in which the four documents in the query are each quantized into a unique cell in the set of ten cells. In this case, TDist is (1/16)*(1+1+1+1), or 1/4. Now consider the case in which each of the four documents in the query are quantized into the same cell in the set of ten cells. In this case, TDist is (1/16)*(16), or 1.

In some embodiments, the distortion measure is given by:

$$\text{Distortion}(q_j, R) = F_i(X_i); \quad (2')$$

where
$X_i$ is the number of documents mapped to cell i; and
$F_i(X_i)$ for i, ..., n, are different functions.

The present invention allows for variants of TDist. For example, in some embodiments, the measure of distortion is:

$$\text{Distortion}(q_j, R) = F(Z) \quad (2')$$

where $$Z = \left[ \frac{1}{m^A} \sum_{0}^{n-1} X_i^2 \right]^B,$$

F is some function and A and B are any numbers and are the same or different. In a some embodiments F is merely identity, A is two, and B is one and, therefore, equation 2' reduces to equation 2. In some embodiments, F is an exponential or logarithmic function.

KDist, a distortion measure for scenario 2. Under Scenario 2, the TDist distortion measure cannot be used. The error can no longer be measured solely through artificial ties. This is because the relative ordering of documents can be different in the final rankings induced by the composite score. Therefore the present invention defines a more suitable distortion measure, KDist, based on techniques for comparing rank orders described Cynthia et al. "Rank aggregation methods for the web," Proceedings of the Tenth International World Wide Web Conference, 2001, which is hereby incorporated by reference in its entirety. Consider two partially ordered lists of URLs, $\tau$ and $\tau_q$, each of length m, corresponding to rankings induced by exact and approximate composite scores, respectively. Let U be the union of the URLs in $\tau$ and $\tau_q$. If $\delta$ is U–$\tau$, then let $\tau'$ be the extension of $\tau$, where $\tau'$ contains $\delta$ appearing after all the URLs in $\tau$ (the URLs within $\delta$ are not ordered with respect to one another). $\tau_q$ can analogously be extended to yield $\tau'_q$. Given this terminology, the distortion measure KDist for scenario 2 is defined as follows:

$$KDist(\tau, \tau_q) = \frac{|\{(u, v) : \tau', \tau'_q \text{ disagree on order of } (u, v), u \neq v\}|}{(|U|)(|U|-1)} \quad (3)$$

$KDist(\tau, \tau_q)$ is the probability that $\tau$ and $\tau_q$ disagree on the relative ordering of a randomly selected pair of distinct nodes $(u, v) \in U \times U$. Thus, to compute $KDist(\tau, \tau_q)$, the number of pairs of documents in ranking $\tau$ for which the relative ordering is not the same as the relative ordering in $\tau_q$ is counted and this number is normalized by the number of possible document pairs in $\tau$ (or the number of pairs actually compared). When this is done, the mean of the error metric falls between 0 and 1 and the median of the error metric represents the probability that the relative ordering of a pair of documents in $\tau$ does not agree with the relative ordering of the corresponding pair of documents in $\tau_q$. As an example, consider the two lists:

| $\tau$ | $\tau_q$ |
|---|---|
| A | A |
| B | C |
| C | B |
| D | D |

There are six possible pairs to consider between lists $\tau$ and $\tau_q$ A-B, A-C, A-D, B-C, B-D, and C-D. The relative ordering of A and B matches in both lists $\tau$ and $\tau_q$. That is, A comes before B in both lists. Completing the analysis:

| | |
|---|---|
| A-B | Matches |
| A-C | Matches |
| A-D | Matches |
| B-C | Does not match |
| B-D | Matches |
| C-D | Matches |

Thus, in this case, $KDist(\tau, \tau_q) = 1/6$.

3. FIXED-LENGTH ENCODING SCHEMES. In this section, fixed-length encoding schemes are described and the optimal encoding under the mean-square error (MSE) distortion measure is provided. Further, an empirical measure of MSE-performance of various fixed-length encoding schemes is described. The "best" fixed-length quantizer q can be chosen by answering the following three questions. First, what is the appropriate measure of distortion D(q) for the application? Second, how many cells should the partition have? In other words, what is the appropriate choice for n, noting that (a) the codeword length is given by $[\log_2 n]$, and (b) smaller n will lead to higher distortion. Third, for a particular n, what compressor function G(x) should be used to minimize distortion?

Answering the second question is addressed by choosing a codeword length that will allow the encoded ranking vector to fit in available memory. If the first question is addressed by choosing the mean-squared error, then results from the quantization literature (e.g., Panter and Dite, "Quantization in pulse-count modulation with nonuniform spacing of levels," Proceedings of IRE, January 1951, and Gray and Neuhoff, "Quantization," IEEE Transactions on Information Theory 44(6), October 1998, which are hereby incorporated by reference in their entireties) allow for the choice of the optimal compressor function based on the distribution of the input values, leading to the answer for Question 3. This case (i.e., where D(q) is the mean-squared error) is addressed first and then the use of more appropriate distortion measures is addressed below.

The optimal compressor function G(x) (i.e., the G(x) that will minimize the quantization MSE) is determined by the probability density function (pdf) of the input data, p(y). In particular, the optimal compressor is given by the following:

$$G(x) = c \cdot \int_{-\infty}^{x} p(y)^{1/3} dy \quad (4)$$

where c makes G(x) integrate to 1. See, for example, Panter and Dite, "Quantization in pulse-count modulation with nonuniform spacing of levels," Proceedings of IRE, January 1951. Fortunately, the entire ranking vector that is to be encoded (PageRank) is available, making p(y) easy to determine. In the following section, the distribution of values of PageRank vectors in a test dataset is described and p(y) for this dataset is derived. Then, using this p(y) the MSE performance of six fixed-length coding schemes is analzyed.

PageRank Distribution. To compute the right hand side of Equation 4, the relative frequency distribution p(y) of the values of the PageRank ranking vectors to be encoded is examined. PageRank is an iterative computation performed over the link graph of the Web that assigns an estimate of importance to every page on the Web. See, for example, Page et al., "The PageRank citation ranking: Bringing order to the web," Stanford Digital Libraries Working Paper, 1998, which is hereby incorporated by reference. A topic-sensitive extension to PageRank, Haveliwala, "Topic-sensitive PageRank," Proceedings of the Eleventh International World Wide Web Conference, 2002, which is hereby incorporated by reference in its entirety, modifies the link-graph computations to assign an estimate of importance, with respect to particular topics, to every page on the Web.

Figure 2:
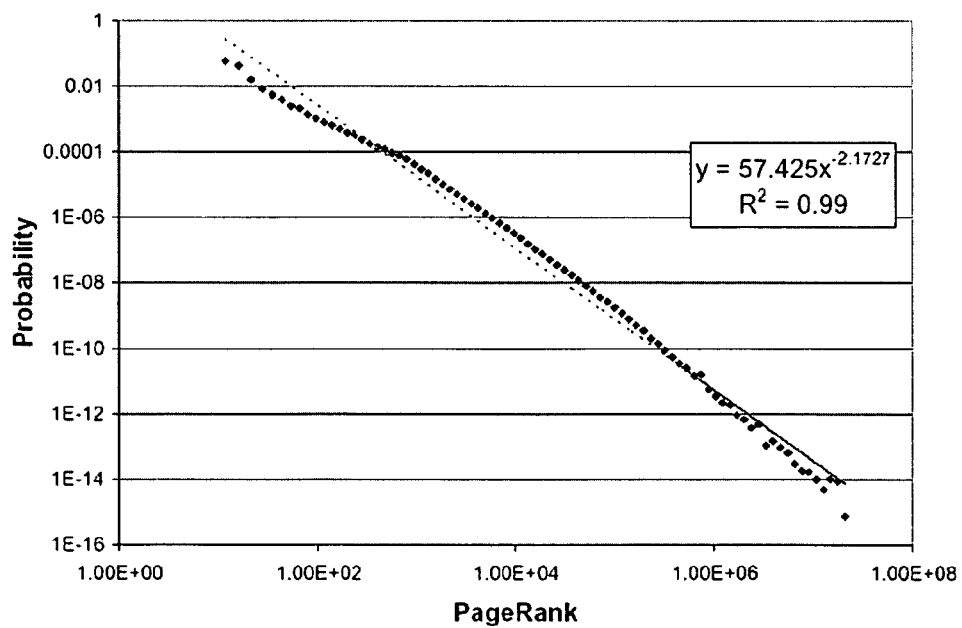
FIG. 2 illustrates a PageRank distribution on a log-log scale based 360 million URLs generated form a 120 million web page repository. The best-fit power-law curve is shown, with a slope close to −2.1.

The dataset used in this analysis is the Stanford WebBase crawl repository of 120 million pages, containing a total of 360 million distinct URLs. See Hirai et al., "Webbase: A repository of web pages," Proceedings of the Ninth International World Wide Web Conference, 2000, which is hereby incorporated by reference in its entirety. This latter count includes pages that were linked-to from crawled pages, but were not themselves crawled. Note that using a standard 4-byte floating point representation, the PageRank vector for these 360 million pages requires 1.34 gigabytes of storage space. FIG. 2 shows the distribution of the standard PageRank values for this dataset on a log-log plot. In plotting the distribution, logarithmic binning is used, with the counts normalized by bin width. In other words, when computing the relative counts shown on the y-axis, bins of equal width on a logarithmic scale were used, and the counts were divided by the actual width of the bin. This technique was needed, as the data is very sparse for high rank values. A similar approach was used in Pennock et al., "Winner's don't take all: Characterizing the competition for links on the web," Proceedings of the National Academy of Sciences, 2002, which is hereby incorporated by reference in its entirety. As seen in FIG. 2, the distribution appears to follow a power-law with exponent close to 2.17, similar to the findings of Pandurangan et al., "Using PageRank to characterize web structure," Proceedings of the Eighth Annual International Computing and Combinatorics Conference, 2002, hereby incorporated by reference in its entirety, on a different dataset. Pandurangan et al provides a graph-generation model that explains this observed property of the Web.

Figure 3:
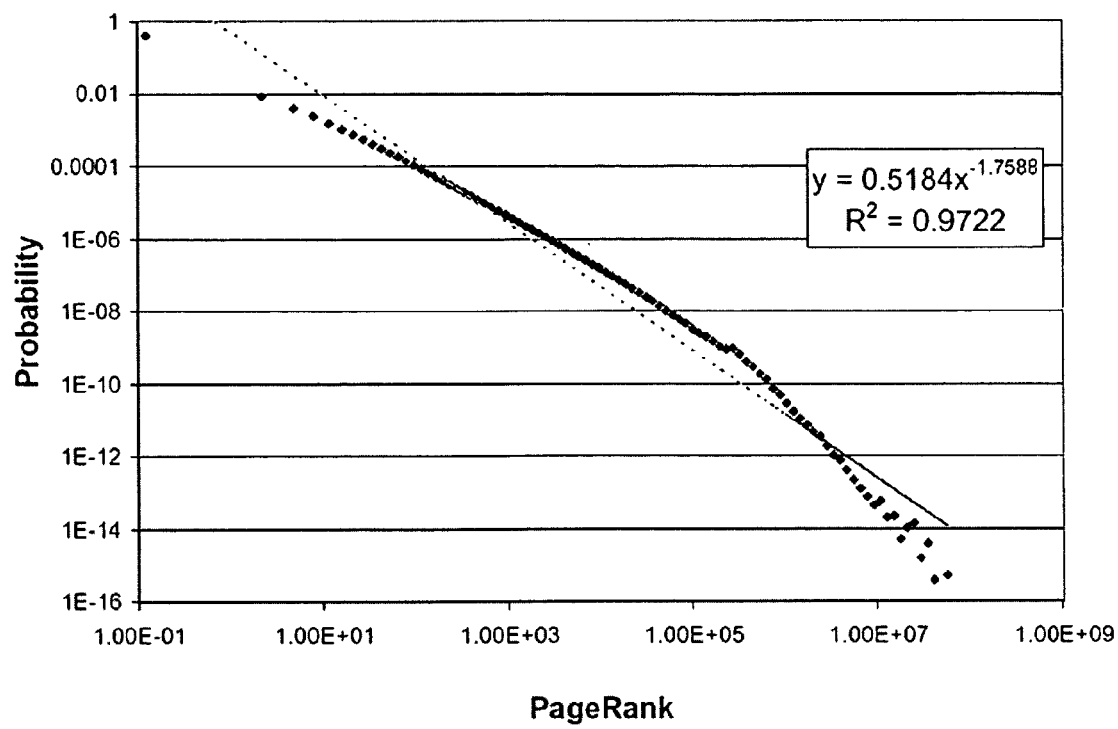
FIG. 3 illustrates a computers-biased PageRank distribution on a log-log scale, with a slope close to −1.8, which is not as steep as a conventional PageRank distribution.

The topic-specific rank vectors constructed following the methodology proposed in Haveliwala, "Topic-sensitive Page Rank," Proceedings of the Eleventh International World Wide Web Conference, 2002 (which is hereby incorporated by reference in its entirety) behave similarly. For instance, the values for the PageRank vector generated with respect to the COMPUTERS topic follow the distribution shown in FIG. 3. Note that the power-law fit is not quite as close, with the slope steepening noticeably in the tail. The best-fit powerlaw exponents for the topic-specific PageRank distributions all ranged between 1.7 and 1.8. Because developing efficient encodings for the topic-specific rank vectors is analogous to developing encodings for the standard PageRank vector, the remaining discussion focuses solely on encodings for the standard Page Rank vector.

Accordingly, given this analysis, when computing the optimal compressor function for a standard PageRank vector for minimizing the mean-square error (MSE), Equation 4 is computed with the probability distribution function $p(y) = k \cdot y^{-2.17}$, $y > y_{min}$.

MSE Performance of Fixed-Length Schemes. This section compares the performance of various fixed-length encoding schemes using the mean-squared-error (MSE) measure. Except for the equal_depth strategy, the quantizers are implemented as companders. A summary of the strategies considered is given in Table 1. For clarity, in all the graphs that follow, the order of the entries in the graph legend reflects the relative position of the corresponding curves in the graph.

TABLE 1

A description of six quantization strategies

| Strategy | Description |
| --- | --- |
| Linear | A uniform quantizer (partition uses cells of equal width) |
| Sqrt | Compander with $G(x) \propto \sqrt{x}$ |
| Log | Compander with $G(x) \propto \log x$ |
| Mse_optional | Compander with $G(x) \propto x^{-2.17}$ |
| Approx_eq_depth | Compander that approximates equal depth partitions, as described in the section in 4. entitled "Approximating Equal-Depth Partitions" |
| Eq_depth | Quantizer where partition assigns an equal number of points to each cell (by varying cell widths as appropriate based on input data) |

Figure 4:
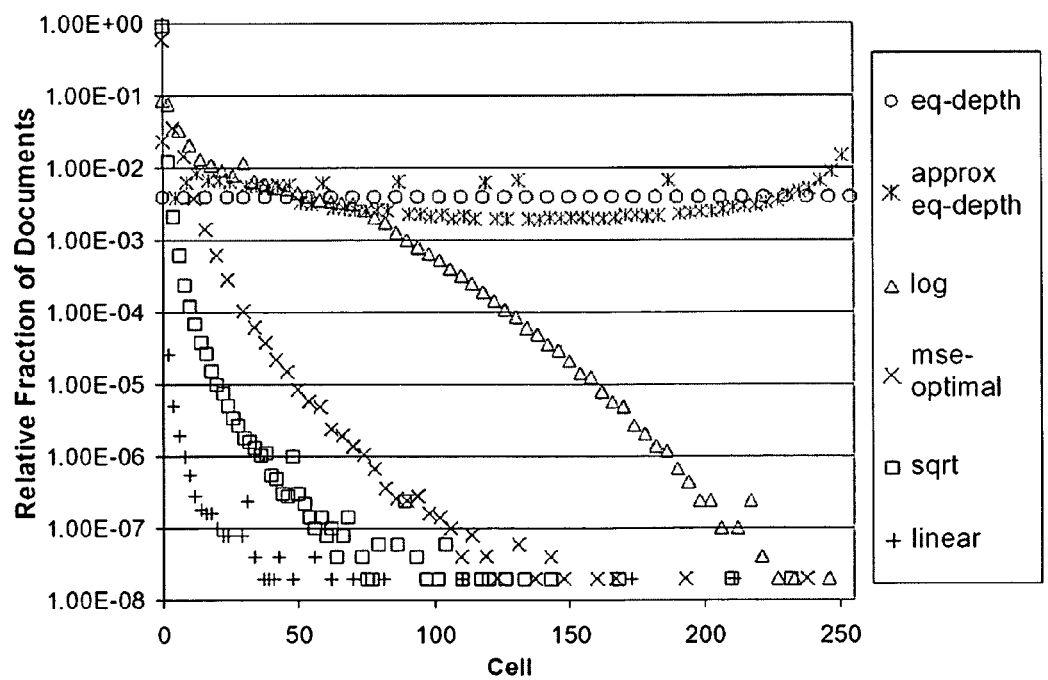
FIG. 4 illustrates relative cell counts for various strategies for 8-bit codes (i.e., 256 cells), where the y-axis gives the fraction of the values in the input mapped to each cell.

To illustrate the behavior of the quantization strategies on the PageRank values for the 360 million URLs, FIG. 4 shows the relative number of input points mapped to each cell (i.e., the depth of each cell) for six different strategies when using 256 cells. The y-axis is a log scale, to facilitate comparison. The figure depicts how the various compressor functions transform the input data, whose distribution was earlier shown in FIG. 2. Because of PageRank's power-law distribution, it is seen that for the linear strategy (i.e., each cell has equal width) most cells are empty.

Figure 5:
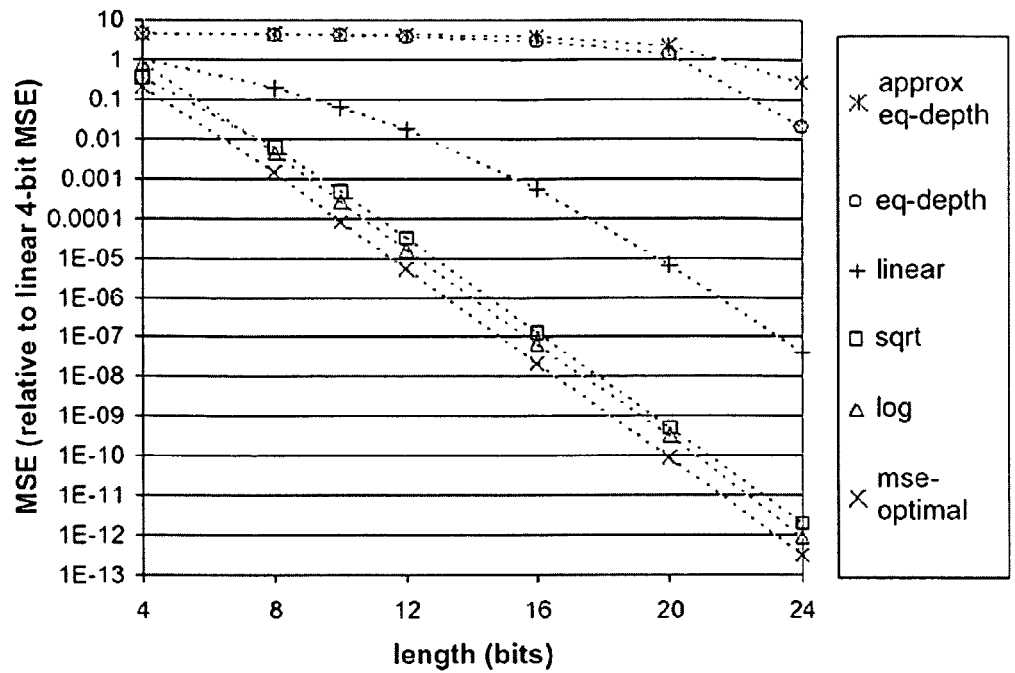
FIG. 5 illustrates the mean squared error (MSE) of six different compression strategies in accordance with the present invention, for codeword lengths varying from 4 to 24. The MSE is on a log scale, and is normalized so that the MSE of the 4-bit linear compander is 1.

To compare the strategies in the traditional numeric fashion, the MSE for each strategy encoding the standard PageRank vector was computed. The number of cells used was varied from 24 to $2^{24}$; i.e., the number of bits necessary for a fixed-length code varied from 4 to 24 bits per value. FIG. 5 graphs the MSE vs. code-length for each of the strategies. It is seen that that mse optimal performs the best, as expected, with log and sqrt not far behind. In the following section, however, it will be seen that if a distortion measure based on the induced rankings of query results is used rather than the MSE, the choice of optimal strategy differs.

4. OPTIMIZING FIXED-LENGTH ENCODINGS FOR RANK-BASED DISTORTION MEASURES.

This section addresses how to choose the optimal quantization rule in the context of search ranking for the keyword search task, under various distortion measures and probabilistic models. These distortion measures and probabilistic models are designed to provide a measure of error that is more useful than the MSE of Equation 1. In general, unless both the search model and distortion measure are fairly simple, analytically deriving the optimal quantization rule becomes complex. Optimal quantization rules are derived for simple cases, and experimental data is relied upon to derive optimal quantization rules for more complex cases.

An outline of this section follows. First, an introduction to a simplified model of the keyword search process is provided and the optimal quantization strategy for this model is analytically derived. Then the derivation is extended to richer models of search. Next a technique to approximate the optimal strategy using a simple compander is described. Then empirical results describing the distribution of the data that provides justification for the simplified models is presented. Next experimental results illustrating the performance of the quantization strategies under various ranking models and corresponding distortion measures is provided.

Retrieval and Ranking Model. The first case is a simplified model of a keyword search to allow for the analysis of the effects of quantization on query-result rankings. The first part of the model describes the retrieval of the candidate documents for a query. Let D be the set of documents in the Web-crawl repository. Retrieve(D, Q) is defined as the operation that returns the set $R \subset D$ consisting of documents that satisfy the query Q. For example, R could be the set of documents that contain all of the query terms in Q. For simplicity, the operation Retrieve(D, Q) is modeled as generating a random sample of size M from D, with each element of D having an equal probability of appearing in the result set.

The second part of the model describes the ranking of the documents. Consider a single auxiliary ranking vector that is used to rank the documents in R (i.e. one column in $\{\vec{R}_i\}$ of FIG. 1). For example, assume that the candidate results will be ranked solely by their PageRank, ignoring any additional information available. Also assume that all full-precision PageRank values for the candidate documents are distinct. This assumption fails to hold only for values close to the minimum. The full-precision PageRank values $R_p(d)$ induce a total ordering over the set R. If quantized PageRank values $q(R_p(d))$ are used, then a weak ordering is induced instead. In other words, the relative order of the documents in R is preserved except for false ties between documents with PageRank values mapped to the same quantizer cell.

The third part of the model is the distortion measure used to judge the rank order inaccuracy caused by quantization. In the simplified scenario being developed, this measure consists of penalizing the false ties, as described in Scenario 1 (each of the k, here k is 1, attributes can be used separately to rank the candidate result documents to generate k intermediate rank orders, which are then aggregated to generate a final rank order over the candidates), above.

Derivation of Optimal Quantizers. The optimal quantizer is now derived for the simple model just presented. In particular, the case is considered where Retrieve(Q, D) returns M documents from a repository D uniformly at random, without replacement. Let $X_i$ be the number of documents M mapped to cell i.

The number of documents M returned by Retrieve(Q, D) will be different for different queries; i.e., M is a random variable. For now, consider the case where M=m for some constant m. As previously described in conjunction with Equation 2 above, the distortion of a particular result of length m can be measured by the sum of squares of the number of points in the same cell, normalized so that the maximum distortion is 1 in scenario 1. In other words, the distortion of the results R, where |R|=m, is measured using a quantizer with n cells as:

$$\text{Distortion}_m(q_j) = \frac{1}{m^2} \sum_0^{n-1} X_i^2. \quad (5)$$

Here D, the documents in the corpus, are treated as a multitype population, with n types. The type of each document is simply the cell it is mapped to by the quantizer Let $N_i$ represent the number of points in the input data set (i.e., the PageRank vector that is being compressed) that the quantizer maps to cell i (i.e., the count of each type), and let N be the total number of input values (i.e., $N = \Sigma N_i$). Because the operation Retrieve(D, Q) samples from the population D uniformly at random, without replacement, $<X_0, \ldots, X_n-1>$ follows the multivariate hypergeometric distribution, with parameters m and $<N_0, \ldots, N_n-1>$. Assume that $|D|>>|R|$, so that the multinomial distribution (i.e., the distribution that would arise if Retrieve(D, Q) sampled with replacement), with parameters m and $$\left\{\frac{N_0}{N}, \ldots, \frac{N_{m\ldots 1}}{N}\right\},$$

is a reasonable approximation. The approximation has no impact on the final solution, see FIG. 17 for a full derivation using the multivariate hypergeometric distribution. The task of finding the optimal n-cell quantizer is reduced to choosing cell depths which minimize the expectation of Equation 5. Note that linearity of expectation allows each $X_i$ to be considered separately, even though they are not independent:

$$E[\text{Distortion}_m] = \frac{1}{m^2} E\left[\sum X_i^2\right] \qquad (6)$$

$$\frac{1}{m^2} \sum E[X_i^2] \qquad (7)$$

Since each $X_i$ follows a binomial distribution, $E[X_i^2]$ is easy to find. Letting $$p_i = \frac{N_i}{N},$$

and using the known mean and variance of binomial random variables (see Grimmett Stirzaker, *Probability and Random Processes*, Oxford University Press, New York, 1992, which is hereby incorporated by reference in its entirety) it is seen that:

$$E[X_i] = mp_i \qquad (8)$$

$$var[X_i] = E[X_i^2] - E[X_i]^2 \qquad (9)$$

$$var[X_i] = mp_i(1-p_i) \qquad (10)$$

$$E[X_i^2] = mp_i(1-p_i) + (mp_i)^2 = mp_i + m(m-1)p_i^2 \qquad (11)$$

So, it is necessary to find the $p_i$ that minimizes $$E[\text{Distortion}_m] = \frac{1}{m^2} \sum E[X_i^2] \qquad (12)$$

$$= \frac{1}{m^2} \sum_i (mp_i + m(m-1)p_i^2) \qquad (13)$$

$$= \frac{1}{m} + \frac{m-1}{m} \sum_i p_i^2 \qquad (14)$$

The above is equivalent to minimizing $\Sigma_i p_i^2$, subject to the constraint $\Sigma_i p_i = 1$. Lagrange multipliers can be used to show that the optimal solution is given by $$p_i^* = \frac{1}{n} \qquad (15)$$

$$N_i^* = N p_i^* \frac{N}{n} \qquad (16)$$

In other words, an equal-depth partition scheme that places equal numbers of points in each cell minimizes the expected distortion of the query results for the TDist distortion measure.

The above considered the case where M, the number of results, was fixed to some constant m. However, different queries have different numbers of results, so that M is a random variable. However since Equation 16 is independent of m, the optimal solution in the case where M varies is also given by Equation 16.

Several extensions to make the model of the operation Retrieve(D, Q) more realistic are now presented. Consider the case where the candidate query-results are first pruned based on a threshold for their cosine similarity to the query, then ranked purely by the quantized PageRank $q(R_p)$. The intuition behind this model is that the ranking function first chooses a set of documents thought to be relevant to the query, and then ranks these relevant candidates by their popularity. Experiments conducted to address this issue showed virtually no correlation between the PageRank of a document, and its cosine similarity to queries. The exact correlations are not given here, but were all close to zero. This result is expected, since PageRank is a purely link-based, query-independent estimate of page importance. Since the pruned candidate set is expected to follow the same distribution as the raw candidate set, the optimal solution is unchanged in this new model.

A second extension to the model is to make the random sampling nonuniform. In other words, each document can have a different probability of being chosen as a candidate result. In this case, the hypergeometric distribution no longer applies since different objects of a given type have different probabilities of being chosen. It could be assumed that the result set R is constructed by a sequence of m multinomial trials (i.e., sampling with replacement). Let p(d) be the probability of document d being chosen during a trial. Let $p(\text{cell}_i) = \Sigma d_j \in \text{cell}_i p(d_j)$. Then the random vector $<X_0, \ldots, X_n-1>$ follows the multinomial distribution with parameters m and $<p(\text{cell}_0), \ldots, p(\text{cell}_n-1)>$. The previous multinomial assumption holds if, in addition to the requirement $|D|>>|R|$, it is also stipulated that no document dominates the probability mass of its cell. If p(d) is extremely nonuniform among documents with similar values of the attribute being quantized, then sampling with replacement is no longer a good approximation to sampling without replacement. If the multinomial approximation does hold, then a derivation, similar to the above, shows that an equiprobable partition is optimal. In other words, instead of making the depths of all cells constant, the probability mass assigned to each cell is made constant:

$$\sum_{d_j \in \text{cell}_i} p(d_j) = \frac{1}{n} \qquad (17)$$

In the general case, where the final rankings are generated using arbitrary ranking functions that numerically combine the scores from several ranking vectors, developing a probabilistic model for analytically deriving a solution becomes difficult; for such cases, empirical results are relied upon, measuring the average distortion across a large number of sample queries.

Approximating Equal-Depth Partitioning. Using an equal-depth partition, although optimal for the TDist distortion measure, could lead to additional overhead. In the encoding phase, the true equal-depth scheme would require a binary search through the interval endpoints to determine the appropriate cell for each input value. Since the encoding step is performed offline, the cost is acceptable. However, in the decoding step, if the reproduction value for a particular cell is needed, a true equal-depth partition scheme requires a codebook that maps from cells to cell centroids, leading to additional space as well as processing costs. Here it is shown how an equal-depth partition can be approximated by using a simple compander, with a compressor function derived from the distribution of the underlying data, thus eliminating both the need for binary searches when encoding, and the need for a codebook at runtime.

If the input data values were distributed uniformly, it would intuitively be expected that a uniform partition would be similar to an equal-depth partition. This intuition is confirmed as follows. Let N be the total number of points, and let $N_i$ be the number of points that fall in cell i, for a quantizer with n cells. If the input points are distributed uniformly at random, then clearly each $N_i$ follows the binomial distribution with parameters $$\left(N, \frac{1}{n}\right).$$

Thus, the expected number of points in each cell is simply $$\mu = E[N_i] = \frac{N}{n}.$$

The probability that $N_i$ falls within a tight range of this expectation is high for large N, with n N. For instance, for $N=10^8$, $n=10^6$, and using the normal approximation for $N_i$, $Pr[0.8\mu \leq N_i \leq 1.2\mu] \approx 0.95$.

Note, however, that the input data is not uniform. In particular, as discussed Section 3, PageRank closely follows a power-law distribution. However, a compressor function $G_{eq}(x)$ that transforms the data to follow a uniform distribution can be devised and the transformed data can then be uniformly quantized, thus approximating an equal-depth quantizer. Let X be a random variable following the power-law distribution, with exponent 2.17. I.e., the probability density function (pdf)$f(x)$ for X is $f(x)=kx^{-2.17}$. Equivalently, if $x_{min}$ is the minimum possible rank, and $x_{max}$ is the maximum possible rank, the cumulative distribution function (cdf) is $$F(x) = \frac{k}{1.17}(x_{min}^{-1.17} - x^{-1.17}),$$

where the cdf is $\int_{x\ min}^x pdf(y)dy$). The normalization constant k is chosen so that $F(x_{max})=1$. A function $G_{eq}(x)$ is desired such that $G_{eq}(X)$ corresponds to a uniform distribution, i.e., a $G_{eq}(x)$ such that $$Pr[G_{eq}(X) \leq y] = y \quad (18)$$

But it can be seen that, in fact, F(x) itself is such a function, since the cumulative distribution of F(X) is:

$$Pr[F(X) \leq x] = Pr[X \leq F^{-1}(x)] = F(F^{-1}(x)) = x \quad (19)$$

Note that $\forall_x f(x) > 0$ implies that F(x) is strictly increasing, and thus invertible.

Thus, a function $G_{eq}(x)$ that will transform the PageRank data to uniformly distributed data is the cdf F(x), assuming that the PageRank distribution is a close fit for the power-law. This transformation allows for the elimination of an explicit codebook, instead using $G_{eq}(x)$ and $G_{eq}^{-1}(x)$ as the compressor and expander functions, respectively, to approximate an equal-depth partition. The empirical distribution of $G_{eq}(X)$, shown in FIG. 4 as the series approx_equal_depth, does indeed appear to be roughly uniform. The results that will be described in Section below show that in practice, this approximation leads to performance similar to that of exact equal-depth partitioning.

Figure 6:
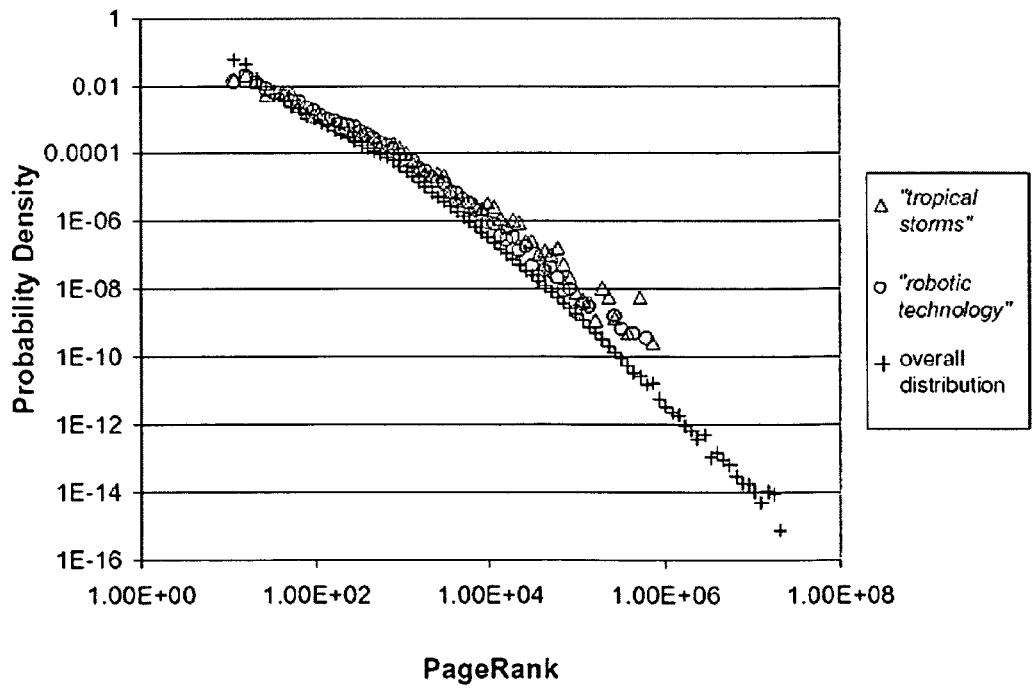
FIG. 6 illustrates a comparison of the PageRank distribution for the corpus of a large queried document repository as a whole, to the set of pages containing the query terms "tropical storms," and the set of pages containing the query terms "robotic technology." PageRank distribution for the raw conjunctive query results in close to the distribution of the overall corpus.

Data Distribution Corpus vs. Query Results. When deriving the optimal quantizer for the TDist distortion measure (Equation 6), it was assumed that the operation Retrieve(Q, D) could be modeled as a uniform random sample of D. Empirical data is now presented to show that this assumption is reasonable. The PageRank distribution of the raw query results for each of 86 test queries was plotted. In every case, the PageRank distribution closely matched the distribution of PageRank values in the corpus D as a whole. The distribution of PageRank values for the results of two representative queries is displayed in FIG. 6.

Figure 7:
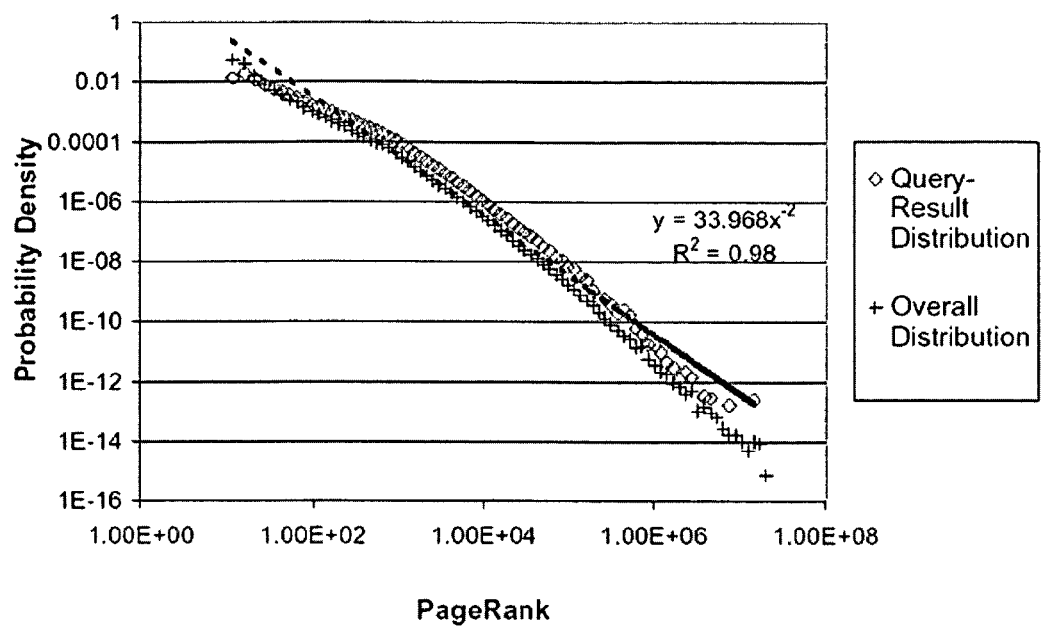
FIG. 7 compares the PageRank distribution for the repository as a whole, to the distribution for the set of results to 43 of the test queries.

The distributions were not an exact match, however, leading to the possibility that equiprobable and equal-depth partitions will not behave identically. The set of test queries was randomly partitioned into two halves. Using the first set, the distribution of PageRank values of documents in the results for the queries was measured. FIG. 7 shows that this distribution deviates slightly from the distribution of PageRank values in the corpus as a whole. The distribution of PageRank values, when restricted to documents that appear as raw candidate results, seems to follow a power-law distribution with exponent close to 2.0. In other words, under the simplified model of the operation Retrieve, higher rank documents have a slightly higher probability of appearing in raw query results. The term "raw query results" is used here to mean the set of documents containing all of the query terms for some query.

Empirical Performance Under Rank-Based Distortion Measures. The empirical performance of various quantization schemes on sample query results is now discussed. A test set of 86 queries was used. The set consisted of 36 queries compiled from previous papers and 50 queries created using the titles from the TREC-8 topics 401-450 (National Institute of Standards and Technology (NIST), The 8th Text Retrieval Conference (TREC-8), 1999). Using a text index for the repository, for each query, the URLs for all pages that contain all of the words in the query were retrieved.

Figure 8:
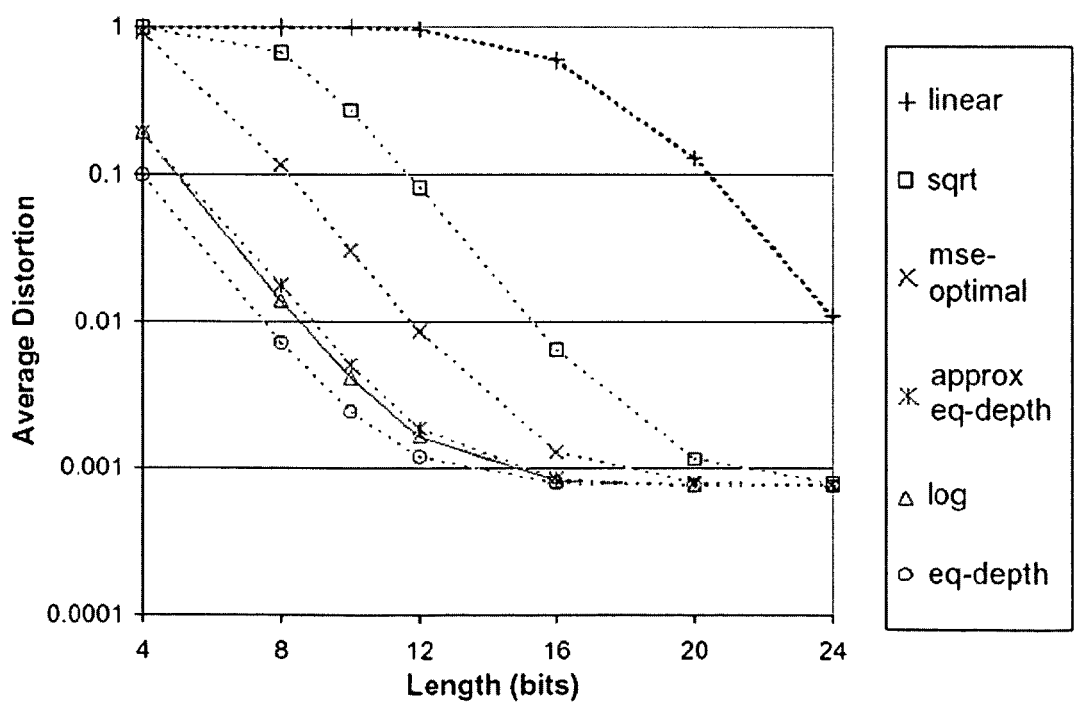
FIG. 8 illustrates the average distortion for the various compression strategies when using the TDist distortion measure (Equation 6) over the full lists of query results, for 86 test queries according to some embodiments of the invention.

FIG. 8 plots the average (over the 86 query results) of the distortion for the six strategies when using the TDist distortion measure. As expected, the equal_depth strategy performs the best for all codelengths. Also note that the approx_equal_depth and log strategies also perform similarly. Notably, the mse_optimal strategy, which was optimal when using the MSE distortion criteria, is no longer the optimal choice— this result signifies the need to consider appropriate notions of distortion when choosing quantization strategies for search rankings.

Figure 9:
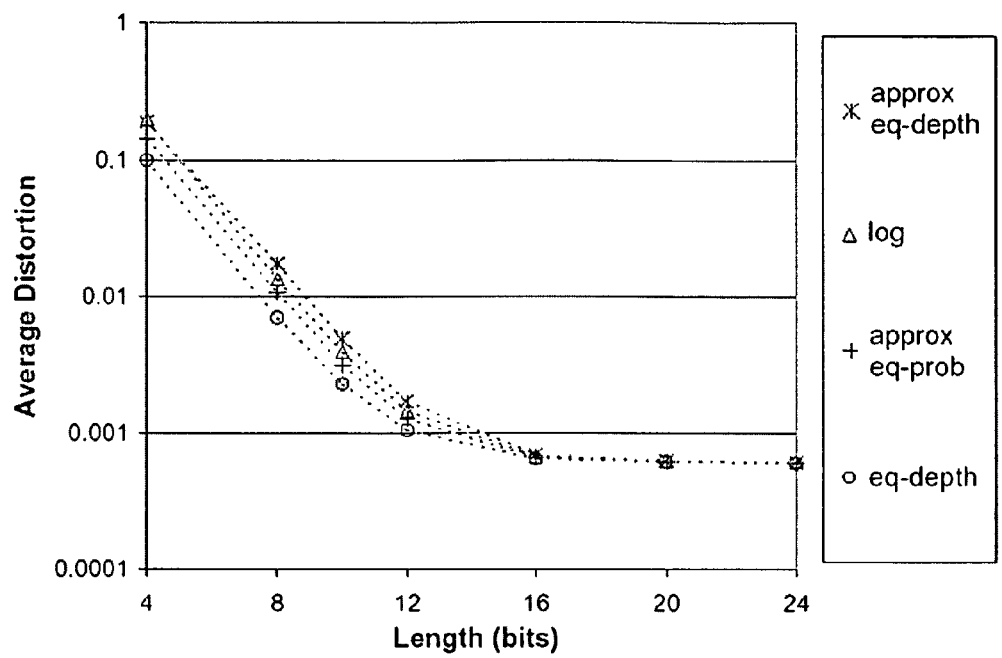
FIG. 9 shows how an approximate equiprobable partition outperforms an approximate equal-depth partition on the TDist distortion measure according to some embodiments of the invention. Documents with high PageRank had slightly higher probabilities of being candidate results.

In Section 4, it was noted that, for the TDist distortion measure, for a retrieval model in which documents in the corpus have different probabilities of appearing in the results, an equiprobable, rather than an equal-depth, partition is superior. As mentioned in the section entitled "Data distribution: corpus vs. query results", a slight correlation was noted between the PageRank and the probability of appearing in the raw candidate result set. To test the performance of the equal_prob strategy, the compander described in the section entitled "Approximating Equal-Depth Partitioning" was implemented, replacing the probability density function with $f(x)=kx^{-2.0}$. On the subset of test queries that were not used in estimating the power-law exponent, performance was measured using TDist, of this approximation to an equiprobable partition. The results are shown in FIG. 9, and demonstrate that the (approximate) equiprobable scheme improves upon the (approximate) equal-depth scheme. However, the true equal-depth scheme still performs the best by a small margin.

Figure 10:
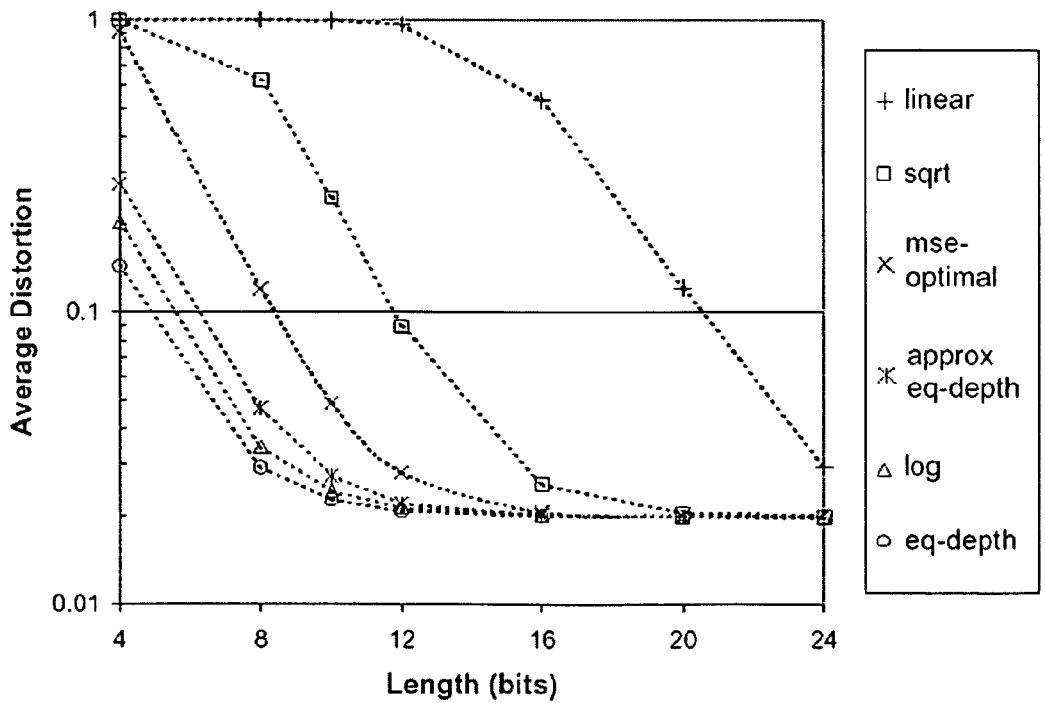
FIG. 10 shows how the average distortion for various compression strategies when using the TDist distortion measure over pruned lists of query results, for 86 test queries according to some embodiments of the invention. The pruned list consisted of the top 100 results based on the cosine similarity of the documents to the query.

FIG. 10 plots the average TDist distortion when the query results are first pruned to include only the top 100 documents based on the pure cosine similarity to the search query, then ranked using only the quantized PageRank value. As expected, the results match the results of FIG. 8; since cosine similarity is uncorrelated with PageRank, the optimal strategy is unchanged from that of FIG. 8.

Figure 11:
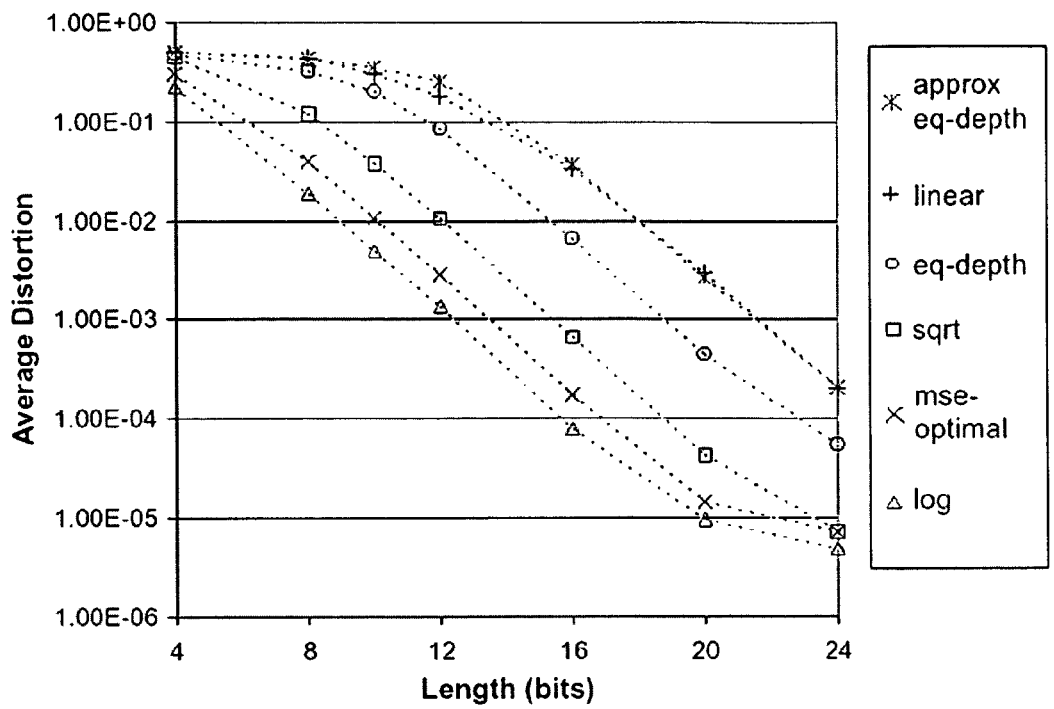
FIG. 11 illustrates the average distortion for the various compression strategies when suing the KDist distortion measure over pruned lists of query results, for 86 test queries according to some embodiments of the invention. The pruned lists consisted of the top 100 results ranked by the score cosQd·rd.

The third query result scenario and distortion measure is in accordance with scenario 2 of Section 2. Let $\tau$ be the ordered list of the top 100 documents when query results are ranked by the composite score $\cos_{Qd} \cdot \tau_d$; let $\tau_q$ be the ordered list of the top 100 documents when query results are ranked by $\cos_{Qd} \cdot q(\tau_d)$ for some quantizer q. Note that $\tau \neq \tau_q$ because $q(r_d)$ is less precise than $r_d$. Distortion is measured KDist described in Section 2. As shown in FIG. 11, in this scenario, the log strategy performs the best for all codelengths in minimizing the mean KDist distortion. The previous results demonstrate the importance of using a distortion measure suited to the ranking strategy used by the search engine when choosing a quantization strategy.

5. VARIABLE-LENGTH ENCODING SCHEMES. Fixed length encoding schemes are simpler to support in the implementation of the ranking function, because the attribute values are at readily computed offsets into the attribute vector. Assuming consecutively assigned document identifiers, and a fixed-length encoding using l bits per codeword, the value for the attribute for document i is at bit location i×l. Variable-length encodings have the potential to reduce the average codeword lengths, and thus the overall storage requirement for the ranking vector. However, the downside is a more complex decoding process, which is less efficient and may not be practical, depending on the search engine's performance criteria. In particular, to retrieve the attribute values when the ranking vector is encoded with a variable-length scheme, a sparse index is needed to allow the lookup of the block containing the desired value. The index needs to be sparse, since otherwise any space savings from a variable-length coding scheme would be lost. Furthermore, all the values in that block preceding the desired value would also need to be decoded. For a large-scale search engine supporting millions of users, this additional overhead may not be affordable. In this section, the effectiveness of variable-length schemes in minimizing storage is first explored, and then the additional runtime costs for decoding variable-length codes is discussed.

Figure 12:
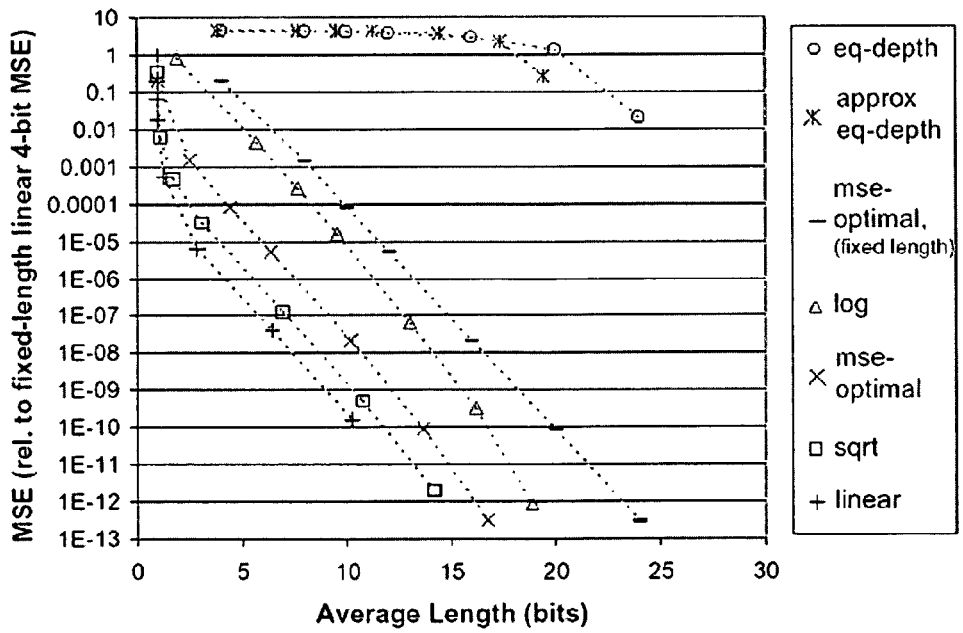
FIG. 12 illustrates the mean squared error (MSE) of six different compression strategies, plotted against the average codeword length used according to some embodiments of the invention. The MSE axis is on a log scale, and is normalized so that the MSE of the 4-bit linear compander is 1. For comparison, the optimal fixed-length performer is shown; the simple linear quantizer, suing variable-length codes, performs better than the optimal fixed-length strategy.
Figure 13:
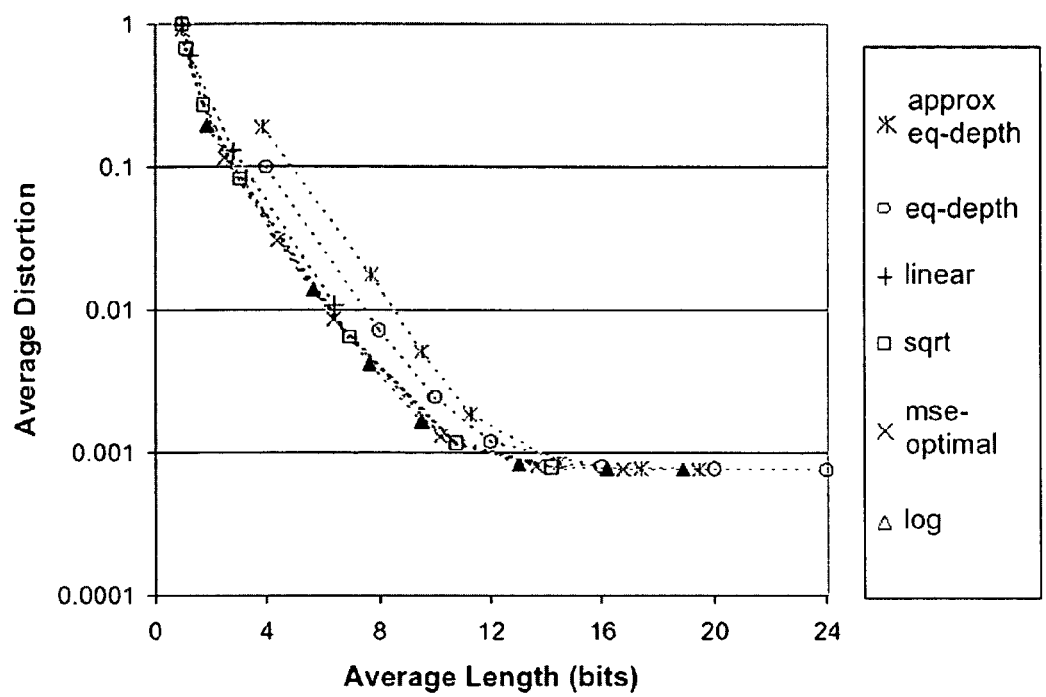
FIG. 13 illustrates the average distortion for the variable length strategies when using the TDist distortion measure over the full lists of query results, for 86 test queries according to some embodiments of the invention. The x-axis represents the average code-word lengths using a Huffman code.

Variable-Length Encoding Performance. To investigate the effectiveness of variable-length schemes, the average Huffman codelengths for the quantization schemes previously discussed in Sections 3 and 4 were computed. When the MSE distortion of FIG. 5 is plotted against the Huffman codelength, rather than the fixed codelength, the uniform quantization strategy, linear (Table 1), becomes the best performer, as shown in FIG. 12. The variable-length encoding for the cells eliminates the inefficiencies of uniform quantization. This effect carries over to the result-based distortion measures as well, as shown in the replotting of FIG. 8, given as FIG. 13. Note that the equal-depth approaches derive no benefit from Huffman coding—the average codelength is reduced precisely when the cell depths are nonuniform. Note also that the average codeword lengths shown in these graphs does not include the memory required for the additional indexes needed at runtime for efficient decoding. Decoding requirements are discussed in the next section. These empirical results indicate that if a variable-length encoding scheme is used to generate codes for the cells, a uniform quantizer performs similarly to the optimal quantizer, under the distortion measures we used.

Variable-Length Encoding Costs. Variable-length encoders outperform fixed-length encoders, when judged on the average codelength needed to achieve a particular distortion, for most of the distortion measures we have discussed. However, there is a substantial processing overhead at query time to decode the numeric attribute values. A goal of the present invention is to reduce the per-document attribute lookup cost by fitting the ranking vectors in main memory. Variable-length encodings are only appropriate if fixed-length encodings are not sufficient to allow the attribute vectors to be stored in memory. The offline and query-time costs of variable-length schemes compared to fixed-length schemes is now addressed.

During the offline step, compression of the input data values using variable-length schemes requires first generating Huffman codes for the cells of the partition, and then generating a compressed version of the input by replacing each input value with the Huffman codeword assigned to the cell the value was mapped. A fixed-length scheme does not require generating a Huffman code—the intervals can be assigned sequential l-bit ids. However, the cost of generating a Huffman code is fairly low; using the implementation of Moffat and Katajainen, "In-place calculation of minimum-redundancy codes" in Akl, Dehne, and Sack, editors, Proc. Workshop on Algorithms and Data Structures, pages 393-402, Queen's University, Kingston, Ontario, August 1995. LNCS 955, Springer-Verlag, which is hereby incorporated by reference in it entirety, it is possible to generate the codebook and compress the input data (360M values, 1.34 GB) in under ten minutes using an AMD Athlon 1533 MHz machine with a 6-way RAID-5 volume. Given the minimal impact of small variations in preprocessing cost, the offline overhead for variable-length encoding schemes is not explored further.

The impact of additional query-time costs, however, is more significant. For both the fixed-length and variable-length scenarios, the query engine typically loads the entire sequence of quantized values into memory as a string b of bits. The assumption is made that documents are identified by consecutively assigned document identifiers, so that the document with ID i is the $i^{th}$ value inserted into the bit string. Then, in the case of a fixed-length scheme with codewords of length l, the attribute value associated with some document is simply the value of the bit substring b[i×l, (i+1)×l−1]. The only cost is a memory lookup. In the case where l is not the length of standard integer data type (e.g., 8, 16, or 32), a few bit shifts are also required.

Figure 14:
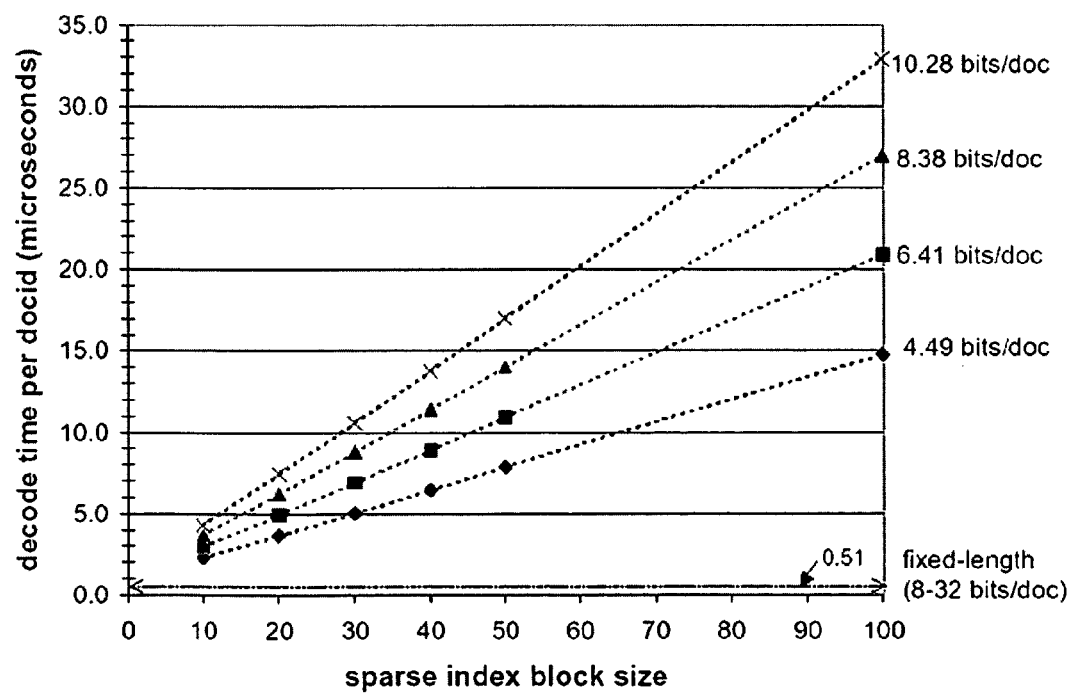
FIG. 14 illustrates the decode time in microseconds per document for a PageRank vector quantized uniformly using variable-length codes with 4 different average codeword lengths according to some embodiments of the invention. The decode time using a fixed-length code is also given for comparison.
Figure 15:
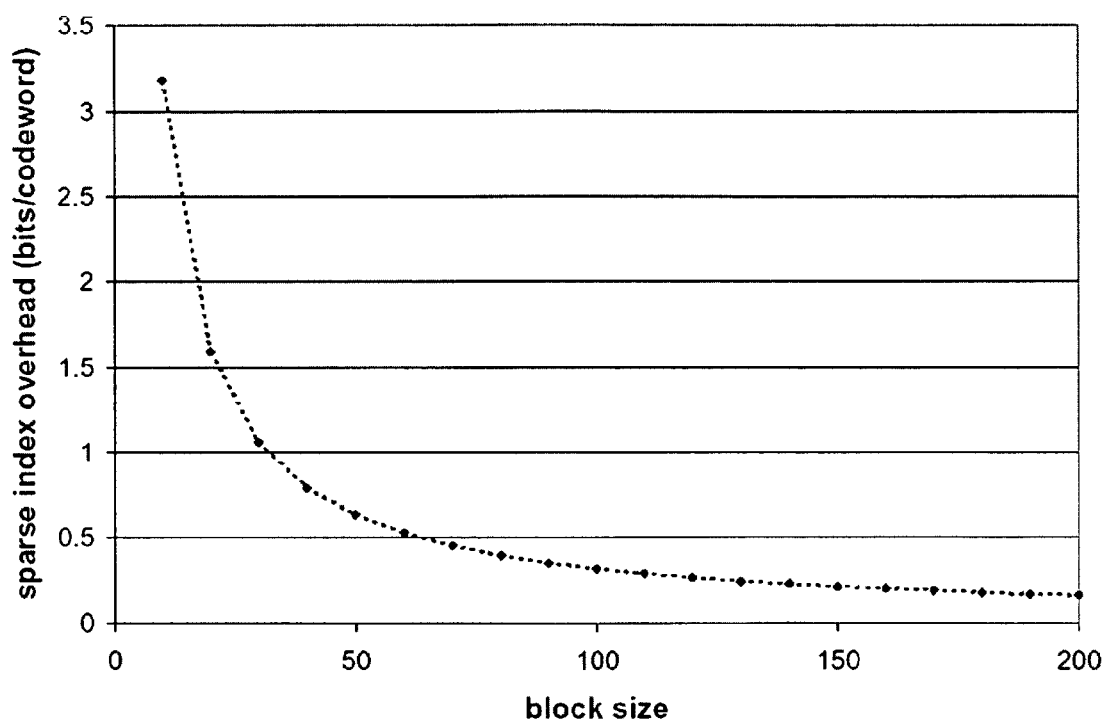
FIG. 15 illustrates the additional space overhead needed by a sparse index, measured as bits/codeword, for block sizes ranging from 10 to 200 according to some embodiments of the invention.

When using a variable-length code, however, for a given document i, finding the exact location for its attribute value in the bit string becomes nontrivial. Decoding from the beginning of the string until finding the $i^{th}$ value is inefficient, making an index necessary. More specifically, since maintaining the exact offset into the bitstring for each value would completely negate the benefit of compression, we must use a sparse index which maintains offsets to blocks of values. Decoding the attribute value for document i requires decoding all the values from the beginning of the block up through the desired value. Thus, the decoding time is proportional the block size B; more precisely, the expected number of decodes is B/2. Using small blocks reduces the decoding time, but in turn increases the space usage of the sparse index. FIG. 14 shows the decode time, in µs/document vs. block size, for four variable-length schemes. For comparison, the decode time for a fixed-length encoding scheme is also given. These times were measured on an AMD Athlon 1533 MHz machine with two gigabytes of main memory. The additional space overhead, in bits/codeword, needed by the sparse index for 360 million values for various block sizes is plotted in FIG. 15.

The times may seem very small, making the variable-length schemes seem attractive; however, for a large-scale search engine, with thousands of concurrent active queries, where each query has thousands of candidate results requiring attribute value decodings for tens of attributes, the perresult decode time needs to be as inexpensive as possible. As an illustrative example, consider a search engine with 1 billion pages with a query workload of 10 queries/second. Assume that each document has a single numeric property (e.g., PageRank) that needs to be decoded for calculating final rankings. Also assume that the average query yields 0.01 percent of the repository as candidate results, so that the processing for each query requires retrieving the numeric properties for 100,000 documents. If a variable-length scheme is used, so that the decode time for a single attribute value for a single document requires 35 µs, decoding alone will require 3.5 seconds of CPU time per query, or equivalently, 35 machines are needed to handle the query workload (if decoding were the only cost in the system). If the decode time for is instead 1 µs per document (e.g., utilizing a fixed-length encoding scheme), only 0.1 second is spent decoding for each query; equivalently, a single machine can handle the query workload. Of course there are other significant costs in the system in addition to attribute value decode time. The goal of this example is simply to provide some intuition as to why per-document decode times need to be kept very small for large-scale search engines.

6. N-DIMENSIONAL CLUSTERING. Previous embodiments have addressed the case where each element of the auxiliary page ranking vector (i.e. each column $\{R_i\}$ of FIG. 1) is independently quantized. However, in some embodiments of the present invention, clusters are chosen based on correlations between one or more columns in $\{R_i\}$. For example, in one embodiment, n columns of $\{R_i\}$ is plotted in n-space and clusters of documents in this n-space are identified and assigned a codeword. In schemes where a predetermined fixed codeword is used, the length of each codeword that is assigned is the same. However, variable length codewords can be assigned. An example serves to illustrate the point. Consider the case where the n-space is 2 and $\{R_i\}$ comprises the following data:

| $r_1$ | $r_2$ |
|---|---|
| −5.1 | −5.2 |
| −5.0 | −5.3 |
| −5.5 | −5.5 |
| −6.1 | −5.0 |
| −5.5 | −4.9 |
| 3 | 3 |
| 3.3 | 3.2 |
| 6 | 6 |
| 6.1 | 6.1 |

Casual inspection of the data indicates that three clusters are forming in 2-space 1: (−5,−5) n=5; 2: (3,3), n=2; and 3: (6,6), n=2. Thus, in this simple example, it would be desirable to assign a short codeword to 1: (−5,−5) and longer codewords to 2: (3,3) and 3: (6,6) since the former cluster has more documents in it that the latter two clusters.

7. AUTOMATED OPTIMIZATION OF QUANTIZATION PARAMETERS. The present invention provides methods to balance the many variables that need to be considered in order to identify optimal quantization conditions for auxiliary page ranking vectors. The variables that need to be optimized include codeword length, fixed versus variable codewords, the quantization function itself, and the number of cells that the quantization function uses. The present invention further provides novel measures of quantization distortion. Such measures of quantization distortion can be used to optimize quantization parameters for a given collection of linked documents. For example, given a maximum allowed memory size and for storage of $\{R_i\}$ and encode/decode overhead, different codeword lengths, and quantization functions can be sampled until quantized distortion is minimized. For instance, in some embodiments a greedy search scheme is used.

Figure 18:
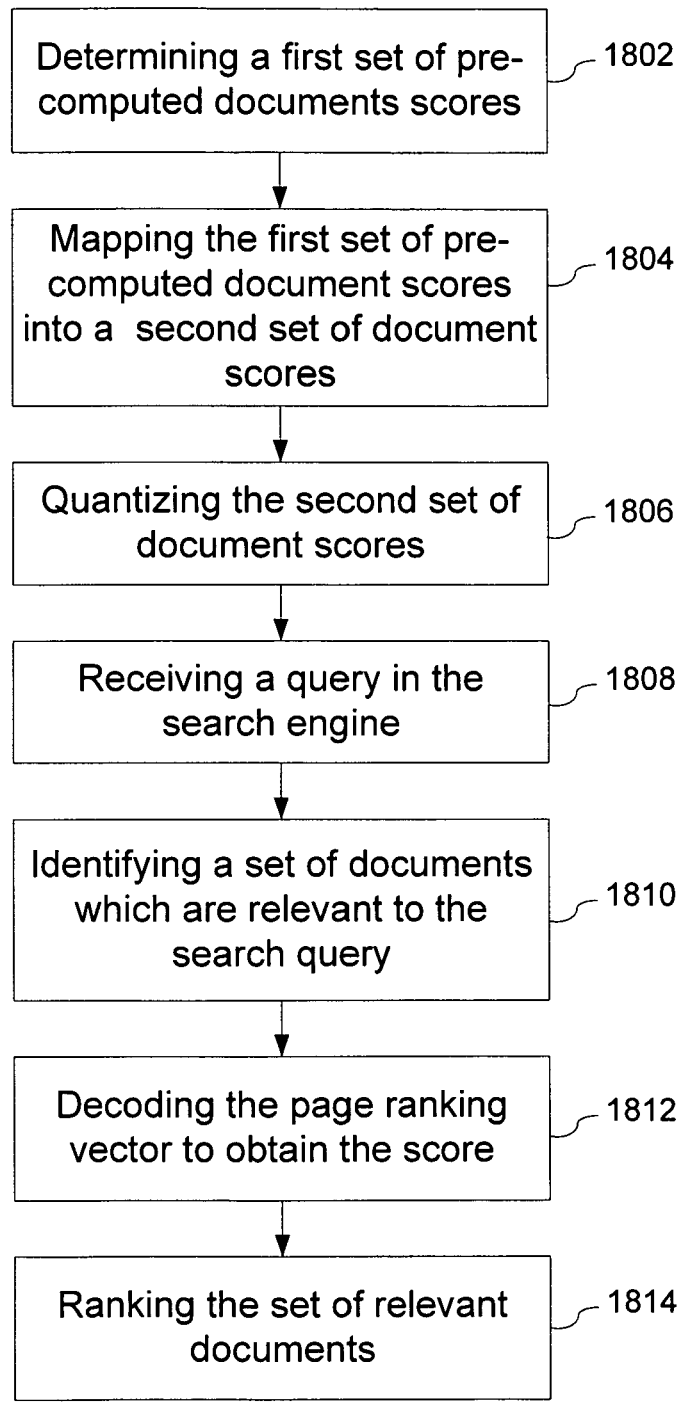
FIG. 18 depicts a process according to some embodiments of the invention.

FIG. 18 depicts a process according to some embodiments of the invention. Initially a first set of pre-computed document scores are determined (1208). In some embodiments, the set is a query independent score associated with a particular document (e.g., PageRank, a value indicating the number of times a particular document had been accessed, or some other metric). In some embodiments, the set is based on a query dependent score where one or more search terms in a search query might be associated with a different set of document scores. For example, a set may be associated with the term "basketball". If a query contains the search term "basketball", then the documents might be ordered based on information from this set of pre-computed scores. In some embodiments, the set of pre-determined scores are a combination of a plurality of pre-determined scores, such that each document's score is some combination of a plurality of ranking scores, each associated with a particular attribute. The chosen set is mapped using some type of transform function (e.g., a compander) into a second set of document scores (1804). For example, as described above, the PageRank vector can be transformed as described above. In some embodiments, the mapping transforms the set into a more uniform distribution of values. In some embodiments, a mapping function is chosen to preserve certain relevant discriminating information inherent in the scores. For example, the PageRank set of scores could be mapped into a set where very low ranked documents are mapped together. In some embodiments, various portions of the second set will have a more uniform distribution than other portions.

The mapped set of scores is then quantized (1806) as described above. In some embodiments the quantization results in a fixed length codeword and in some embodiments, quantization results in a variable length codeword. In some embodiments, the choice of mapping function and quantizing technique is chosen based on the examining a ranking distortion value as described above. In one embodiment, a mapping/quantizing pair is chosen and used with a sample set of queries. An analysis is made of the ranked results produced by the system without mapping/quantizing and compared with using the mapping/quantizing to determine the rank distortion values. In some embodiments the choice of mapping function and quantizer and the mapping and quantizing occurs well in advance of receiving any queries. In some embodiments, the mapping and quantizing occur in the same step.

A search query is received and documents which are relevant to the query are identified as described above (1808). Document scores for the documents are identified by decoding the quantized set of document scores (1812). In some embodiments, the quantized codeword values are used directly without decoding. Using the decoded values (or in some embodiments, the codeword value), the relevant document are ordered (1814) to create a set of ordered documents which are subsequently presented to the user.

In some embodiments, the above techniques apply to a plurality of auxiliary document ranking sets where each set is independently mapped and quantized to reduce the effects of rank order distortion as described above.

Figure 19:
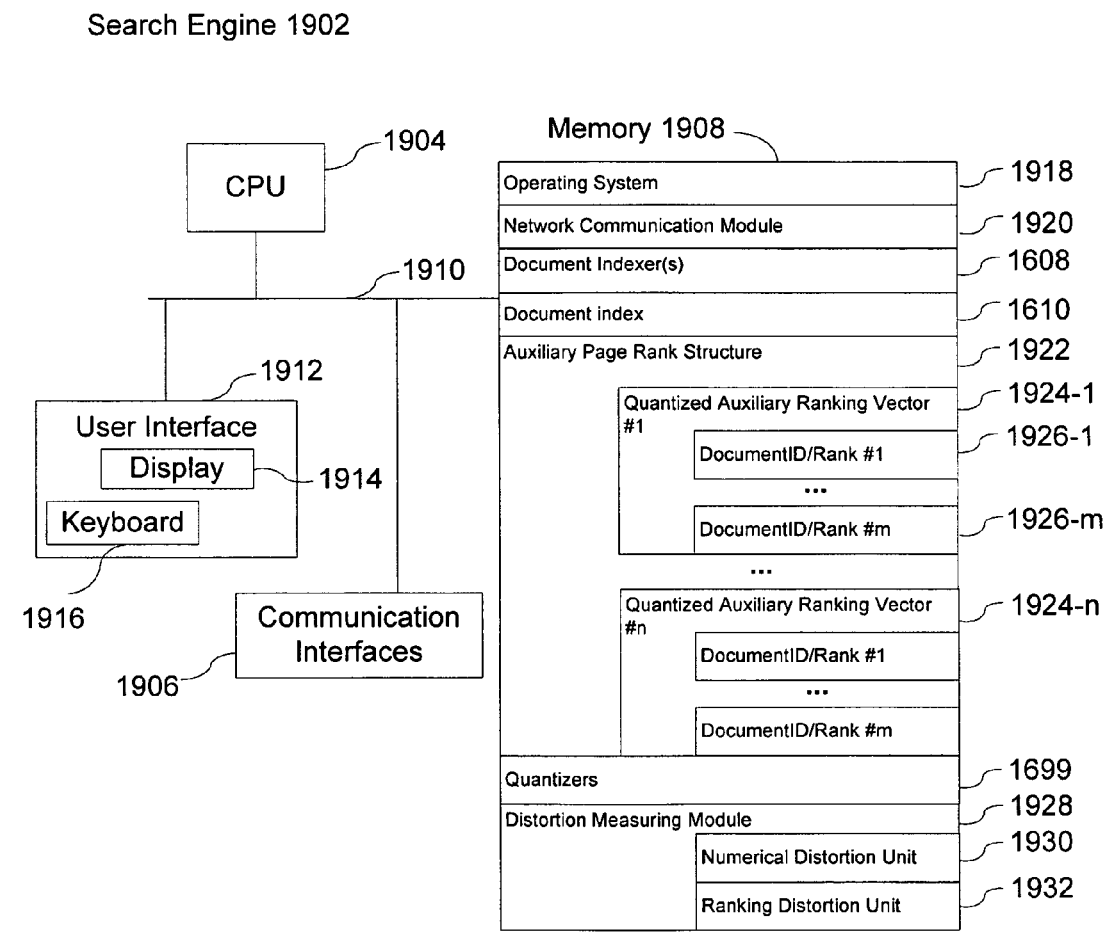
FIG. 19 depicts are search engine which implements some embodiments of the invention.

Referring to FIG. 19, an embodiment of a search engine 1902 that implements the methods and data structures described above includes one or more processing units (CPU's) 1904, one or more network or other communications interfaces 1906, a memory 1908, and one or more communication buses 1910 for interconnecting these components. The search engine 1902 may optionally include a user interface 1912 comprising a display device 1914 and a keyboard 1916. The memory 1908 may include high speed random access memory and may also include non-volatile memory, such as one or more magnetic or optical storage disks. The memory 1908 may include mass storage that is remotely located from CPU's 1904. The memory 1908 may store the following elements, or a subset or superset of such elements:

- an operating system 1918 that includes procedures for handling various basic system services and for performing hardware dependent tasks;
- a network communication module (or instructions) 1920 that is used for connecting the search engine 1902 to other computers via the one or more communications interfaces 1902 (wired or wireless), such as the Internet, other wide area networks, local area networks, metropolitan area networks, and so on;
- document indexers 1608 as described above;
- a document index 1610 as described above including one or more indexes for a plurality of documents as described above;
- an auxiliary page rank structure 1922 which may include one or more quantizied auxiliary page ranking vectors 1924-1 to 1924-n, where n−1 is the number of auxiliary ranking vectors and where each auxiliary page ranking vector 1924 includes one or more documents identifier/rank value pairs 1926-1 to 1926-m, where m−1 is the number of document identifier/rank pairs which are stored for the particular auxiliary ranking vector 1924;
- a quantizers 1699 for quantizing ranking vectors as described above; and
- a distortion measurement module (or instructions) 1928 for measuring distortion as described above, including a numerical distortion unit (or instructions) 1930 for measuring a numerical distortion as described above and a ranking distortion unit (or instructions) 1932 for measuring ranks distortions as described above.

One skilled in the relevant art will recognize that there are many possible modifications of the disclosed embodiments that could be used, while still employing the same basic underlying mechanisms and methodologies. Various functions of the search engine system may be implemented with one or more computer servers distributed over multiple computer networks and over multiple geographical regions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing information related to documents in a collection of linked documents, the method comprising:

quantizing by a data-processing system, for each respective document in all or a portion of said collection, an auxiliary page ranking vector associated with the respective document, wherein each said auxiliary page ranking vector comprises a plurality of attributes, and wherein each attribute is quantized in an independent manner, and wherein said quantizing uses a first quantizer to quantize values for a first attribute in the auxiliary page ranking vectors associated with said collection, and wherein the values x for said first attribute in the auxiliary page ranking vectors associated with said collection are distributed in a power-law distribution m, and wherein the values x are transformed with a first function $F_1(x)$ such that the transformed values become uniformly distributed, and wherein said first quantizer partitions the plurality of transformed first values into a plurality of uniformly spaced cells;

receiving by the data-processing system a search query comprising one or more search terms;

identifying by the data-processing system, using a document index that represents said collection of linked documents, a plurality of documents, wherein each document in said identified plurality of documents includes at least one term that matches a search term in said search query; and ranking by the data-processing system said plurality of documents using said auxiliary page vectors, wherein said ranking comprises:

(i) ranking by the data-processing system, for each respective attribute in said plurality of attributes, said plurality of documents to form an intermediate rank order, and (ii) aggregating by the data-processing system each said intermediate rank order to generate a final rank order for said plurality of documents;

wherein $$F_1(x) = \frac{k}{y-1}(x_{min}^{-(m-1)} - x^{-(m-1)}),$$

y is a second attribute in the auxiliary page ranking vectors associated with said collection, $x_{min}$ is the minimum possible rank for x, and k is a normalization constant.

2. The method of claim 1 wherein said quantizing also uses a second quantizer to quantize values for a second attribute in the auxiliary page ranking vectors associated with said collection.

3. The method of claim 2 wherein the values y for said second attribute in the auxiliary page ranking vectors associated with said collection are distributed in a power-law distribution n; and wherein, prior to quantization by said second quantizer, the method comprises transforming by the data-processing system the values y with a second function F2(y) such that the transformed values become uniformly distributed; and wherein said second quantizer partitions the plurality of transformed second values into a plurality of uniformly spaced cells.

4. The method of claim 3 wherein $$F_2(y) = \frac{k}{y-1}(x_{min}^{-(n-1)} - x^{-(n-1)}),$$

$x_{min}$ is the minimum possible rank for x and k is a normalization constant.

5. The method of claim 1 wherein $F_1(x)=kx^{-m}$ and k is a normalization constant.

6. A method of processing information related to documents in a collection of linked documents, the method comprising:
   (a) quantizing by a data-processing system, for each respective document in all or a portion of said collection, an auxiliary page ranking vector associated with the respective document, wherein each said auxiliary page ranking vector comprises a plurality of attributes, and wherein each attribute is quantized in an independent manner, and wherein said quantizing uses a first quantizer to quantize values for a first attribute in the auxiliary page ranking vectors associated with said collection;
   (b) estimating by the data-processing system a distortion measure for the quantized values of the first attribute, wherein said distortion measure is given by $$\text{Distortion}(q_j, R) = \frac{1}{m^2}\sum_{i=0}^{n-1} X_i^2$$

and where:
   R is the identity of the plurality of documents that include at least one matching term,
   $q_j$ is the identity of said first quantizer,
   n is the number of cells,
   m is the total number of documents in R, and
   $X_i$ is the number of documents mapped to cell i;
   (c) receiving by the data-processing system a search query comprising one or more search terms;
   (d) identifying by the data-processing system, using a document index that represents said collection of linked documents, a plurality of documents, wherein each document in said identified plurality of documents includes at least one term that matches a search term in said search query; and
   (e) ranking by the data-processing system said plurality of documents using said auxiliary page vectors, wherein said ranking comprises:
   (i) ranking by the data-processing system, for each respective attribute in said plurality of attributes, said plurality of documents to form an intermediate rank order, and
   (ii) aggregating by the data-processing system each said intermediate rank order to generate a final rank order for said plurality of documents.

7. A method of processing information related to documents in a collection of linked documents, the method comprising:
   (a) quantizing by a data-processing system, for each respective document in all or a portion of said collection, an auxiliary page ranking vector associated with the respective document, wherein each said auxiliary page ranking vector comprises a plurality of attributes, and wherein each attribute is quantized in an independent manner, and wherein said quantizing uses a first quantizer to quantize values for a first attribute in the auxiliary page ranking vectors associated with said collection;
   (b) estimating by the data-processing system a distortion measure for the quantized values of the first attribute, wherein said distortion measure is given by Distortion $(q_j, R) = F(Z)$, and
   wherein $$Z = \left[\frac{1}{m^A}\sum_{i=0}^{n-1} X_i^2\right]^B,$$

and where:
   R is said plurality of documents that include at least one matching term;
   $q_j$ is the identity of said first quantizer;
   m is the number of cells that q uses to map first values for said first attribute into;
   $X_i$ is the number of documents mapped to cell i;
   n is the power-law distribution for the first attribute;
   F is a function; and
   A and B are any numbers and are the same or different;
   (c) receiving by the data-processing system a search query comprising one or more search terms;
   (d) identifying by the data-processing system, using a document index that represents said collection of linked documents, a plurality of documents, wherein each document in said identified plurality of documents includes at least one term that matches a search term in said search query; and
   (e) ranking by the data-processing system said plurality of documents using said auxiliary page vectors, wherein said ranking comprises:
   (i) ranking by the data-processing system, for each respective attribute in said plurality of attributes, said plurality of documents to form an intermediate rank order, and
   (ii) aggregating by the data-processing system each said intermediate rank order to generate a final rank order for said plurality of documents.

8. The method of claim 7 wherein F is identity, an exponential function, or a logarithmic function.

9. A method of processing information related to documents in a collection of linked documents, the method comprising:
   (a) quantizing by a data-processing system, for each respective document in all or a portion of said collection, an auxiliary page ranking vector associated with the respective document, wherein each said auxiliary page ranking vector comprises a plurality of attributes, and wherein each attribute is quantized in an independent manner, and wherein said quantizing uses a first quantizer to quantize values for a first attribute in the auxiliary page ranking vectors associated with said collection;
   (b) estimating by the data-processing system a distortion measure for the quantized values of the first attribute, wherein said distortion measure is given by Distortion $(q_j, R) = F_i(X_i)$,
   $q_j$ is the identity of first quantizer;
   R is said plurality of documents that include at least one matching term;
   $X_i$ is the number of documents mapped to cell i, and
   $F_i(X_i)$ for i, . . . , n are different functions;
   (c) receiving by the data-processing system a search query comprising one or more search terms;

(d) identifying by the data-processing system, using a document index that represents said collection of linked documents, a plurality of documents, wherein each document in said identified plurality of documents includes at least one term that matches a search term in said search query; and (e) ranking by the data-processing system said plurality of documents using said auxiliary page vectors, wherein said ranking comprises:

(i) ranking by the data-processing system, for each respective attribute in said plurality of attributes, said plurality of documents to form an intermediate rank order, and (ii) aggregating by the data-processing system each said intermediate rank order to generate a final rank order for said plurality of documents.

* * * * *